March 8, 1955 T. J. JUDGE 2,703,839

CODED TRACK CIRCUIT SIGNALING SYSTEM

Filed Sept. 8, 1949 14 Sheets-Sheet 1

INVENTOR.
T. J. Judge,
BY Neil L. Preston,
HIS ATTORNEY.

CODED TRACK CIRCUIT SIGNALING SYSTEM

Filed Sept. 8, 1949

INVENTOR.
T. J. Judge,
BY Neil L. Preston,
HIS ATTORNEY.

CODED TRACK CIRCUIT SIGNALING SYSTEM

Filed Sept. 8, 1949 14 Sheets-Sheet 3

INVENTOR.
T. J. Judge,
BY Neil W. Preston,
HIS ATTORNEY.

March 8, 1955 T. J. JUDGE 2,703,839

CODED TRACK CIRCUIT SIGNALING SYSTEM

Filed Sept. 8, 1949 14 Sheets-Sheet 4

INVENTOR.
T. J. Judge,
BY Neil W. Preston,
HIS ATTORNEY.

March 8, 1955 T. J. JUDGE 2,703,839

CODED TRACK CIRCUIT SIGNALING SYSTEM

Filed Sept. 8, 1949 14 Sheets-Sheet 5

INVENTOR.

T. J. Judge,

BY Neil W. Preston,

HIS ATTORNEY.

March 8, 1955 T. J. JUDGE 2,703,839
CODED TRACK CIRCUIT SIGNALING SYSTEM
Filed Sept. 8, 1949 14 Sheets-Sheet 6

INVENTOR.
T. J. Judge,
BY Neil D. Preston,
HIS ATTORNEY.

March 8, 1955 T. J. JUDGE 2,703,839

CODED TRACK CIRCUIT SIGNALING SYSTEM

Filed Sept. 8, 1949 14 Sheets-Sheet 7

INVENTOR.
T. J. Judge,
BY Neil M. Preston,
HIS ATTORNEY.

March 8, 1955

T. J. JUDGE 2,703,839

CODED TRACK CIRCUIT SIGNALING SYSTEM

Filed Sept. 8, 1949

14 Sheets-Sheet 8

INVENTOR.
T. J. Judge,
BY Neil D. Preston,
HIS ATTORNEY.

INVENTOR.
T. J. Judge,
BY Neil L. Preston,
HIS ATTORNEY.

INVENTOR.
T. J. Judge
BY Neil D. Preston
HIS ATTORNEY.

March 8, 1955 T. J. JUDGE 2,703,839

CODED TRACK CIRCUIT SIGNALING SYSTEM

Filed Sept. 8, 1949 14 Sheets-Sheet 11

INVENTOR.
T. J. Judge,
BY Neil D. Preston,
HIS ATTORNEY.

March 8, 1955 T. J. JUDGE 2,703,839

CODED TRACK CIRCUIT SIGNALING SYSTEM

Filed Sept. 8, 1949 14 Sheets-Sheet 12

INVENTOR.
T. J. Judge,
BY Neil W. Preston
HIS ATTORNEY.

INVENTOR.
T. J. Judge.
BY Neil W. Preston
HIS ATTORNEY.

INVENTOR.
T. J. Judge,
BY Neil W. Preston,
HIS ATTORNEY.

United States Patent Office 2,703,839

Patented Mar. 8, 1955

2,703,839

CODED TRACK CIRCUIT SIGNALING SYSTEM

Thomas J. Judge, Madrid, Spain, assignor to General Railway Signal Company, Rochester, N. Y.

Application September 8, 1949, Serial No. 114,661

21 Claims. (Cl. 246—33)

The present invention relates to automatic signalling systems for railroads, and more particularly pertains to a system of signalling for a single track railroad providing protection for both opposing and following train movements and employing coded track circuits.

One conventional type of signalling system for single track railroads is commonly referred to as an absolute-permissive-block signalling system which provides protection against opposing train movements between the head block signals at the opposite ends of the stretches of single track and yet allows for following train movements with the usual block spacing protection. The system embodying the present invention is quite distinct from the conventional single track signal system just mentioned, in that the protection for both opposing and following train movements is what might be conveniently termed as protection between stations, or head block signal locations. This result is accomplished by the use of coded track circuits and is a particularly desirable organization because it minimizes the amount of apparatus required to provide such coded track circuits as compared to the conventional APB signalling system above mentioned. For this reason, the system of the present invention is particularly adapted for use on single track railroads where safety features are required and yet the traffic is not sufficiently heavy to warrant the more complex types of systems.

Generally speaking, and without attempting to define the exact nature or scope of the present invention, the system contemplated is arranged to establish what is conveniently termed station-to-station (or end-to-end) self-coding during the normal unoccupied condition of a stretch of single track. This end-to-end self-coding operation in some respects might well be termed reflex coding, since the transmission of a code pulse in one direction from one head block signal to the other results at such other head block signal in the transmission of a code pulse to the first head block signal.

However, it is proposed that upon the entrance of a train into a stretch of single track resulting in the interruption of the station-to-station self-coding, operations will be initiated at each of the opposing head block signal locations involved to effect what is termed local self-coding. This local self-coding involves the transmission of code pulses from each head block signal location dependent upon the repeated operation of certain relays at such location. In other words, such local self-coding operation is accomplished by interconnected relays rather than by the operation of the conventional code oscillators.

In the system of the present invention, the number of controls required to be transmitted over any one track section is reduced to a minimum; but, where a multiplicity of controls are required to be transmitted, it is contemplated that this will be accomplished by the use of polarized code pulses. In a system of this character where different code rates are not employed for the transmission of different controls, the rate of code transmission may be reduced to a minimum so as to reduce the wear on the equipment to a minimum, thus further making the system particularly desirable from the economic standpoint.

One of the problems inherent in a system of this character is the occurrence of a so-called code "fight" between the pulses being applied at two opposing head block signal locations when a train leaves the intervening single track stretch. The embodiment of the present invention is so organized as to reduce this conflict in codes to a minimum period of time by causing the local self-coding at one head block signal location to take place at a different rate than the local self-coding at the other head block signal location. In this connection it should also be observed that another object of the invention is to provide a circuit organization at each head block signal location which will transfer from local self-coding conditions to the station-to-station (or end-to-end) self-coding conditions with a minimum of conflict.

In addition to the above general system characteristics, it is an object of the present invention to provide directional stick relays controlled in such a way as to give, at the head block signal locations, control over the transmission of codes in a proper manner regardless of whether a train of the usual length or a light weight engine passes through the track sections adjacent the head block signal locations.

Other objects, purposes and characteristic features of the present invention will be in part obvious from the accompanying drawings and in part pointed out as the description of the invention progresses.

In describing the invention in detail, reference will be made to the accompanying drawings in which like letter reference characters provided with distinctive preceding numerals designate similar parts throughout the several views, and in which:

Figs. 1A to 1D inclusive, adapted to be arranged end-to-end, illustrate one embodiment of the present invention as applied to a typical stretch of single track;

Figures 6E, 7A, 7B, 7C:
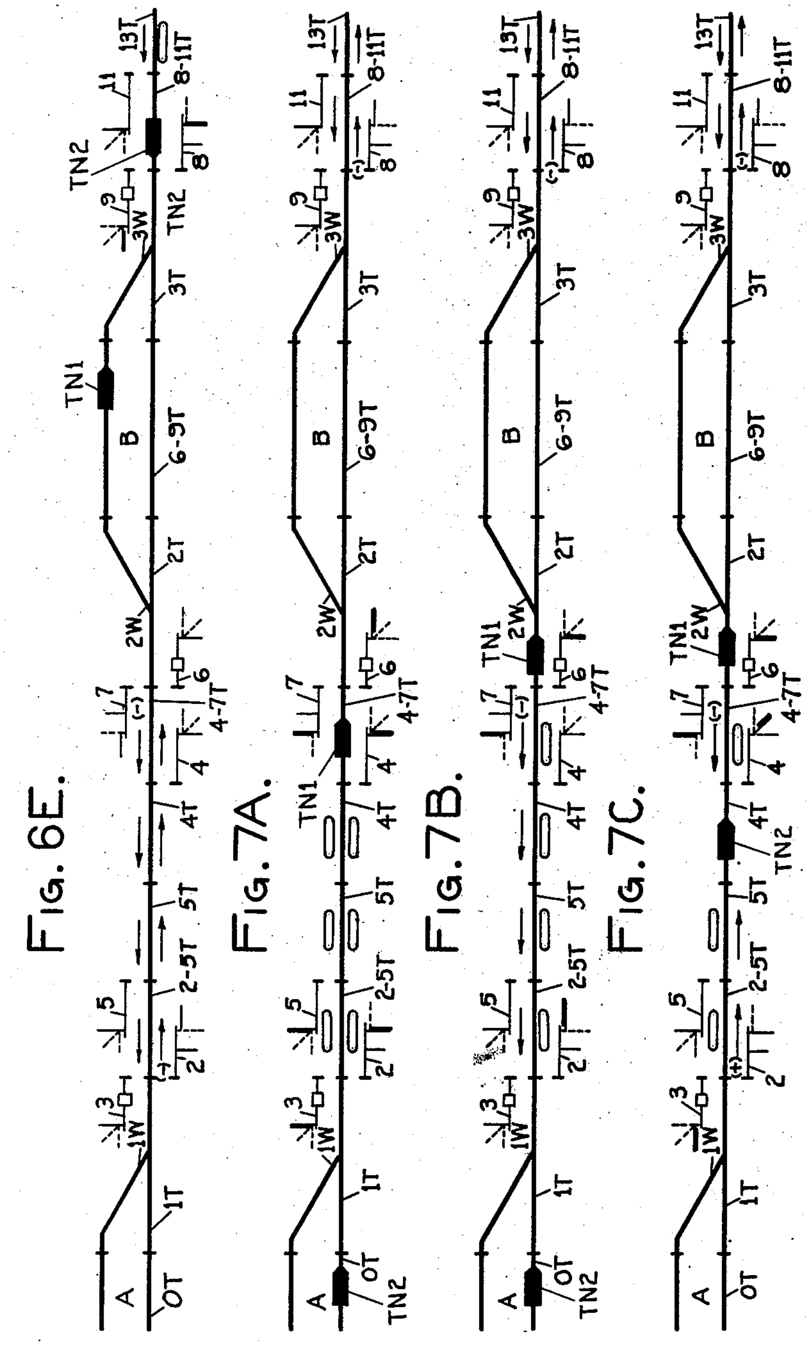
Figure 7D:
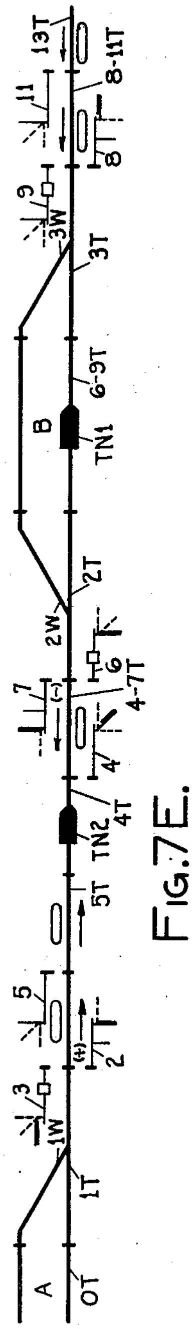
Figure 7E:
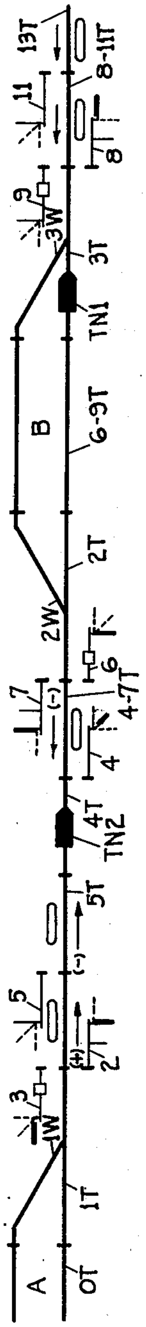
Figure 7F:
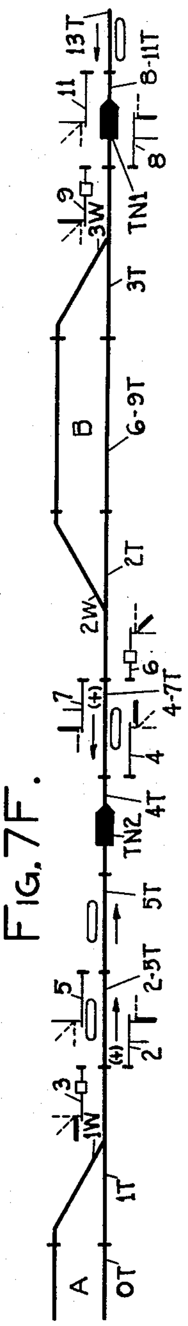
Figure 7G:
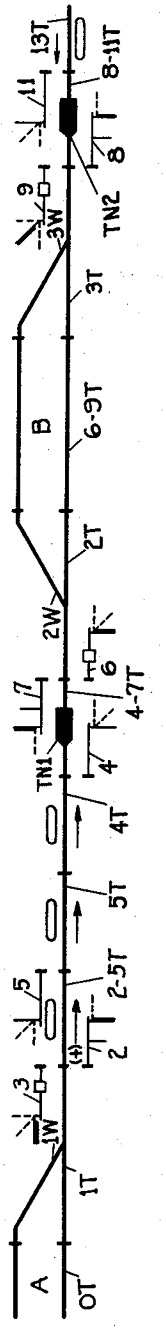
Figure 8:
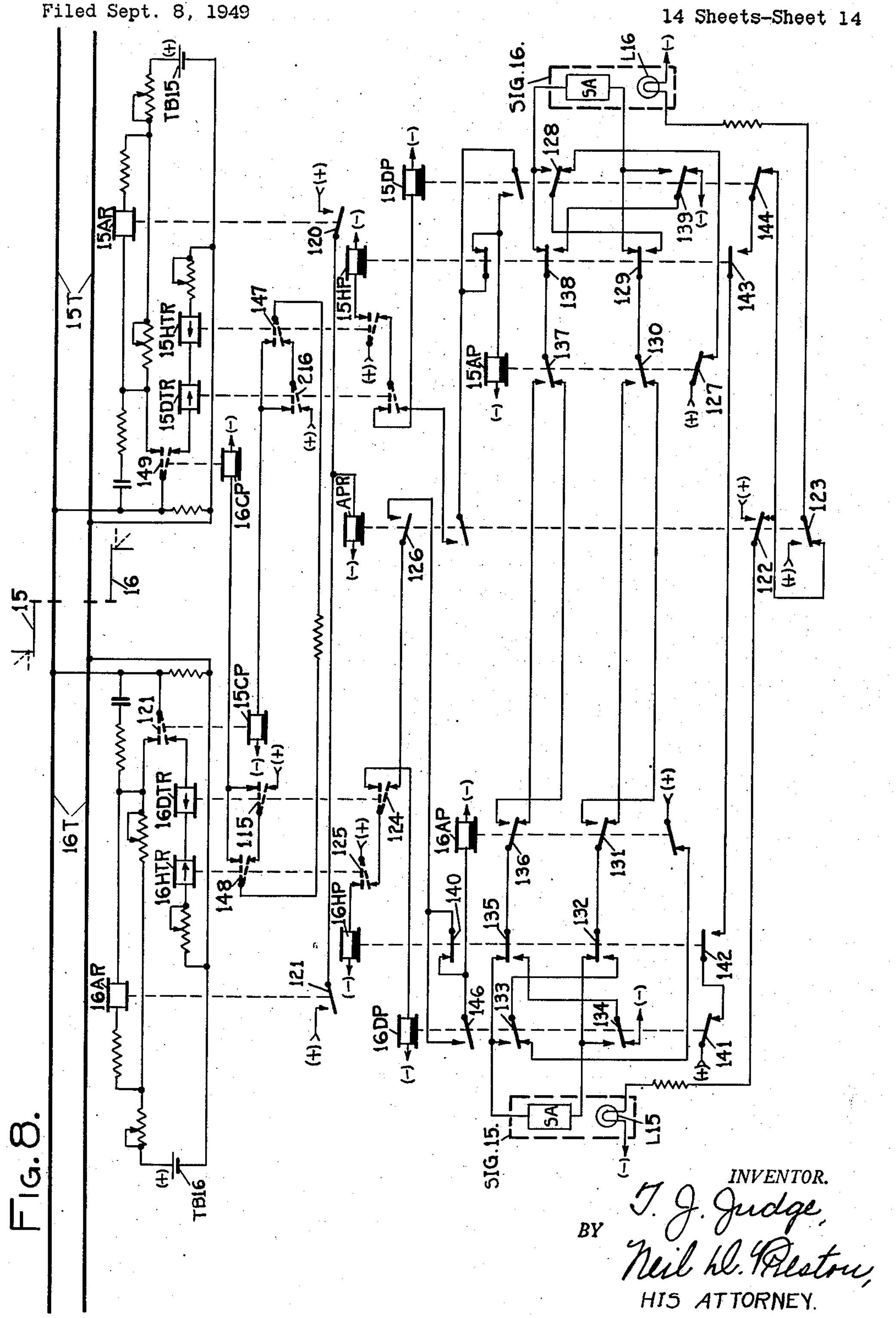

Figs. 5A to 5L inclusive, illustrate the conditions existing on a respective stretch of single track during normal train movements;

Figs. 6A to 6E inclusive, illustrate the conditions of the same respective stretch of single track under conditions of opposing train movements;

Figs. 7A to 7G inclusive, illustrate the conditions for following train movements; and Fig. 8 illustrates diagrammatically the circuit organization for a double intermediate signal such as may be employed in the signalling system of the present invention.

For the purpose of simplifying the illustration and facilitating in the explanation, the various parts and circuits constituting the embodiment of the invention have been shown diagrammatically and certain conventional illustrations have been employed, the drawings having been made more for the purpose of making it easy to understand the principles and mode of operation than with the idea of illustrating the specific construction and arrangement of parts that would be employed in practice. Thus, the various relays and their contacts are illustrated in a conventional manner, and symbols are used to indicate connections to the terminals of batteries, or other sources of electric current, instead of showing all of the wire connections to these terminals.

Although batteries have been shown in some instances in the drawings, generally speaking the symbols (+) and (—) are employed to indicate the positive and negative terminals respectively of suitable batteries or other suitable sources of direct current; and the circuits with which these symbols are used always have current flowing in the same direction.

Referring to Figs. 1A, 1B, 1C, and 1D, these figures, when placed end-to-end, illustrate a portion of a single track railroad including head block signal locations at the east end of a passing siding A, and both the east and west ends of a passing siding B. These two passing sidings A an B are separated by a stretch of single track signalled in accordance with the system of the present invention. The east end of the passing siding B is shown as connecting to another stretch of single track. Although only a limited portion of a single track railroad has been shown, it is to be understood that this portion is merely typical, and that the railroad might extend east or west or both directions to any desired extent. The passing siding A is shown as having a track switch 1W for connecting it with the main track, but normally positioned for main line traffic. Similar switches 2W and 3W are provided for the passing siding B. East-bound traffic is governed by signals 2, 4, 6 and 8, while west-bound traffic is governed by signals 3, 5, 7, 9 and 11. The leaving signals 2, 7, and 8 are of the absolute type, i. e. when these signals are at stop a train must not pass them without superseding instructions. On the other hand, the remaining signals, such as entering signals and approach signals are of the permissive type, i. e. when such signals indicate stop, a train may stop and then proceed at such a low speed as to be able to stop upon sight of an obstruction. The intermediate signal 11 is controlled in the same manner as the other intermediate signals and, since the circuit organization for controlling this signal is identical to that of signal 5, it has not been illustrated in Fig. 1D.

For convenience in the illustration, the various signals are illustrated as being of the searchlight type, but it is to be understood that any other suitable signal structure might well be employed.

The different signal conditions of the portion of railroad illustrated have been diagrammatically indicated in the diagrams of Figs. 5A to 5L inclusive, 6A to 6E inclusive, and 7A to 7G inclusive. These diagrams employ conventional symbols to indicate the traffic conditions. More specifically, trains are indicated in block form, and the various signals are indicated by conventional symbols, the signal arms of which have been shown in heavy lines for those signals which are illuminated, but in light lines for those signals which assume particular conditions, but are not illuminated. The dotted positions for any signal represent the various other positions which that signal can take. It will be noted that the head block signals, such as signals 2, 7 and 8, are of the two-position type, and this is indicated by the various symbols in the diagrams. Arrows have been employed to indicate the presence and direction of the transmitted codes for the various track sections while the absence of such codes has been indicated by ovals. Some of the codes are indicated as being of different polarities by the associated (+) and (—) symbols. The various track sections have been given distinctive numbers in accordance with the numbers of the signals which govern traffic over them.

Each of the track switches is indicated as having associated therewith suitable switch box contacts which assume one position when the track switch is in a normal main line position, an opposite position when the track switch is in the reverse or take-siding position, and an intermediate position whenever the track switch is unlocked or in operation. These switch box contacts are shown as controlling suitable switch position repeating relays. For example, the switch 1W is indicated as having a normal switch repeating relay 1NWP energized only when such switch 1W is in a normal position. Since only the normal position is required to be repeated in the present embodiment, only the normal relays have been indicated in the drawings. It should be understood, however, that similar relays may be provided for indicating when the switches are in reverse positions, if required; or a single polarized relay may be provided for each switch if desired. The relays NWP may be neutral relays of the usual type, or may be polar-biased relays of the type shown in the prior Patent No. 2,414,583, dated January 21, 1947, to give added protection against improper operation due to circuit failures.

Each signal location has its associated apparatus which is quite similar to the apparatus associated with every other signal with a few exceptions. These similar devices have been given the same letter reference characters which are made distinctive by reason of the preceding numerals which correspond with the number of the signal with which they are associated.

Each of the various coded track circuits, as well as the non-coded track circuits, are assumed to be of the conventional direct current type using primary batteries or trickle charged storage batteries as a source for the track circuit current, but it should be understood that the same principles of the present invention may be applied to coded track circuits energized from alternating current sources. In this connection, it will be noted that the track switches have associated therewith the usual detector track circuit of the non-coded type with the usual track battery, limiting resistor, and direct current track relay TR, such as shown for the detector track section 1T. A similar track circuit is provided for each of the track switches, such as detector sections 2T and 3T of Figs. 1C and 1D, respectively.

Figure 1A:
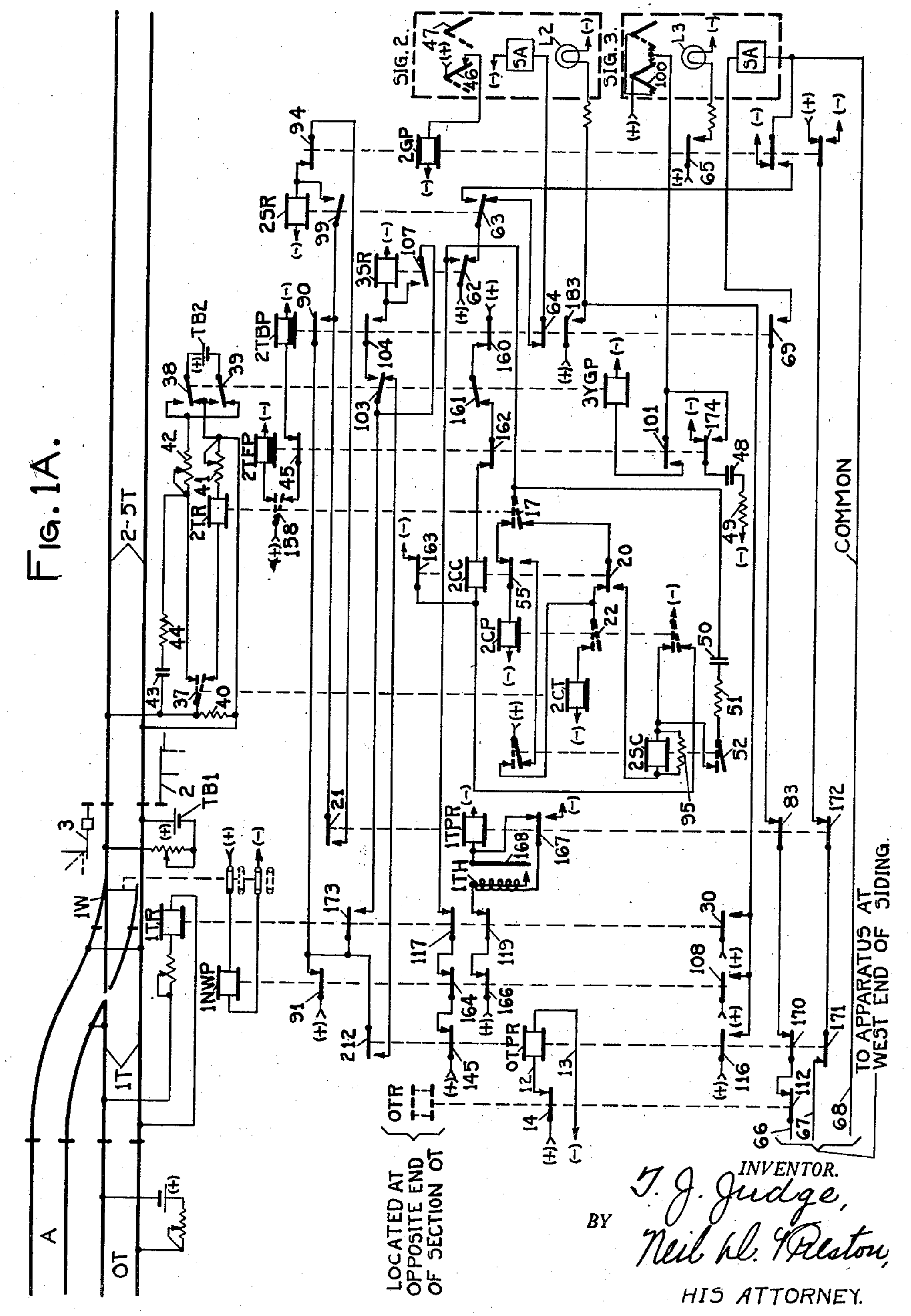

Fig. 1A illustrates that the track section 2–5T has connected thereto a track relay 2TR through the back contact 37 of a code transmitting relay 2CT, while through the front contact 37 of this relay a track battery TB2 is connected, subject to the pole changing contacts 38 and 39 of the yellow-green repeater relay 3YGP of signal 3. A shunting resistor 40 is connected across the track rails for the purpose of protecting contact 37 from an inductive transient current occurring upon the leaving of a train from the track circuit during conditions of high ballast resistance, i. e. when the ballast is dry. The resistor 41 included in series with the track relay 2TR is preferable of the variable type to allow for the adjustment of the track circuit operating values. Similarly, the limiting resistor 42, included in series with the track battery connection through front contact 37 of the code transmitter relay 2CT, is the usual variable limiting resistor which gives an adjustment of the voltage applied across the tracks. The condenser 43 and resistor 44 connected in series across the front contact 37 of the code transmitting relay 2CT reduces the arcing at this contact as it operates to apply and remove code pulses.

The track relay 2TR is provided with a front track repeater relay 2TFP, and a back repeater relay 2TBP is connected through a front contact 45 of the front repeater relay 2TFP. These relays are preferably of the quick pick-up, slow release type which may be effected in any suitable manner, such as by the use of shunting rectifiers, a shunting condenser and resistor. It is sufficient for an understanding of their operation merely to know these characteristics, which have been indicated by their heavy line bases.

The signal 2 is assumed to have a mechanism of the searchlight type such as shown in the patent to O. S. Field, No. 1,835,150, dated December 8, 1931. This signal mechanism has been indicated in the drawings diagrammatically within a dotted rectangle. This diagrammatic illustration indicates the operating winding designated SA, an associated lamp L2, and movable contacts 46 and 47. When the operating mechanism is in a deenergized condition indicating red, the contacts 46 and 47 are in left-hand and right-hand positions respectively, but when the mechanism is energized to cause the signal to give a green indication, the contact 46 is operated to a right-hand position whereas the contact 47 remains in its normal right-hand position.

Although the signal 2 need be only a two-position signal, it may well be of the same type as all the other signals for the sake of uniformity in construction and be capable of assuming three positions when properly controlled. Thus, if the winding SA were to be energized with the opposite polarity (as will be the case for certain other signals), the signal is caused to display a yellow aspect, and the contact 47 is then operated to its left-hand dotted line position while its other contact 46 remains in its left-hand position. The contact 46 of the signal 2 is shown as controlling the green repeating relay 2GP, which is preferably of the type that is both slow to pick up and slow to release. This has been indicated by the relay symbol having a heavy base line and a heavy top line.

The entering signal 3 at this head block signal location shown in Fig. 1A, has associated therewith a yellow-green repeater relay 3YGP which is preferably of the quick acting neutral type with suitable control involving a condenser 48 and a resistor 49 so as to render it selectively slow releasing at times as will be later described.

This head block signal location has associated therewith the code transmitting relay 2CT previously mentioned, and a code control relay 2CC, a code repeating relay 2CP and a self-coding relay 2SC. These relays are interconnected to effect both the local self-coding and the station-to-station self-coding in a manner which will be later described. The relays 2CT and 2CP are preferably of the quick pick-up, slow-release type; whereas, the relay 2CC is preferably of the quick acting type. The relay 2SC is of the usual quick acting type neutral relay but is at times provided with additional release time by means of the condenser 50 and resistor 51 located in a selectively controlled circuit including its front contact 52. The amount of time added to its release by condenser 50 is determined by the value of resistor 95 connected in multiple with relay 2SC.

Each detector track section, such as the track section 1T associated with the switch 1W, is provided with a repeating relay 1TPR which is controlled through a suitable thermal relay 1TH. The purpose of the thermal 1TH is to provide a time period under particular conditions of traffic to avoid the loss of the occupancy condition upon the passage of a light engine, as will be later described. The track relay at one end of a track section opposite a passing siding is provided with a repeater relay at the opposite end of that track section; for instance, repeater relay 0TPR at the east end of section 0T is the repeater of track relay 0TR at the west end of such section. This use of a repeater relay, of course, necessitates the use of line wires between the head block signal locations at opposite ends of such siding.

Figure 1B:
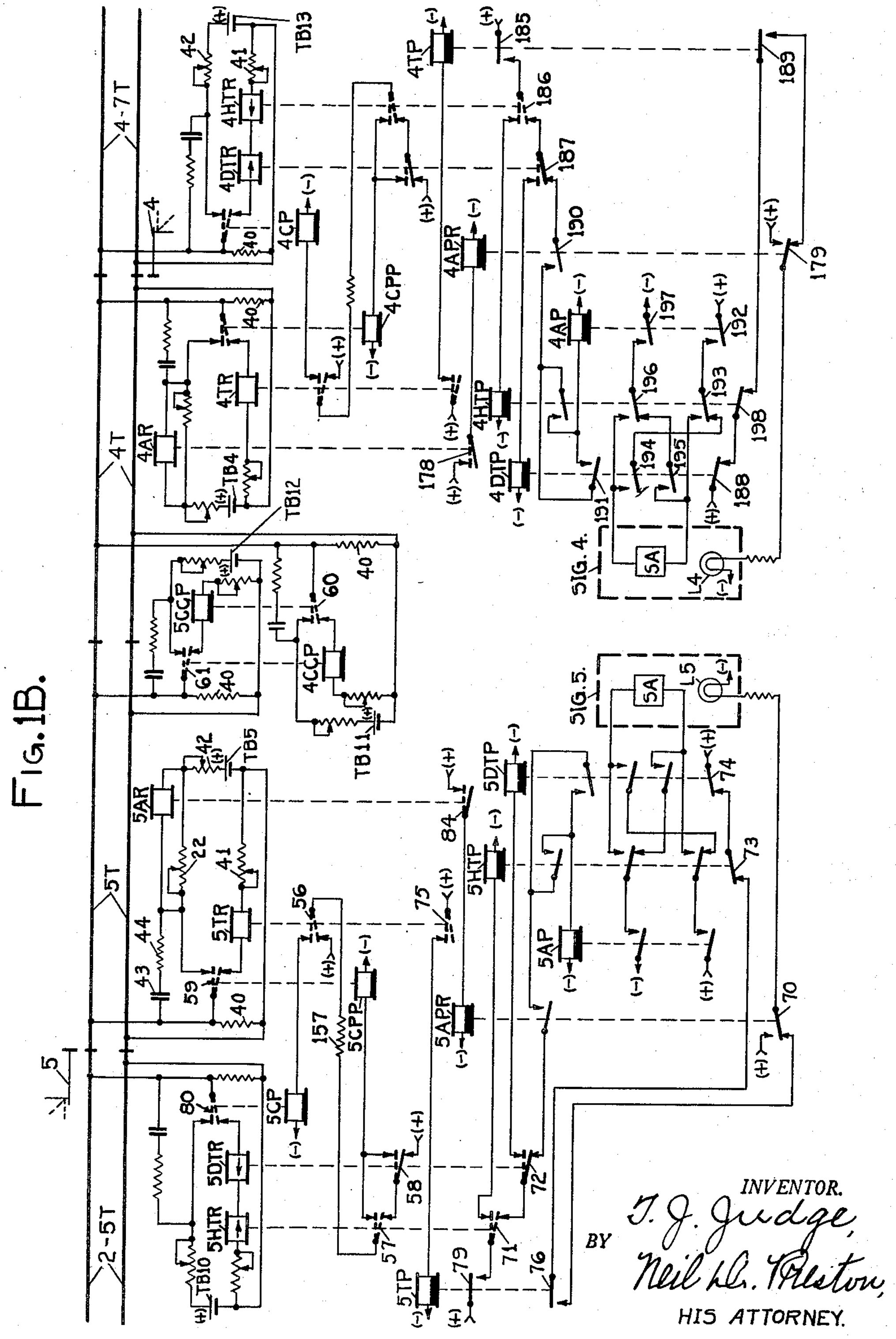
Figure 1C:
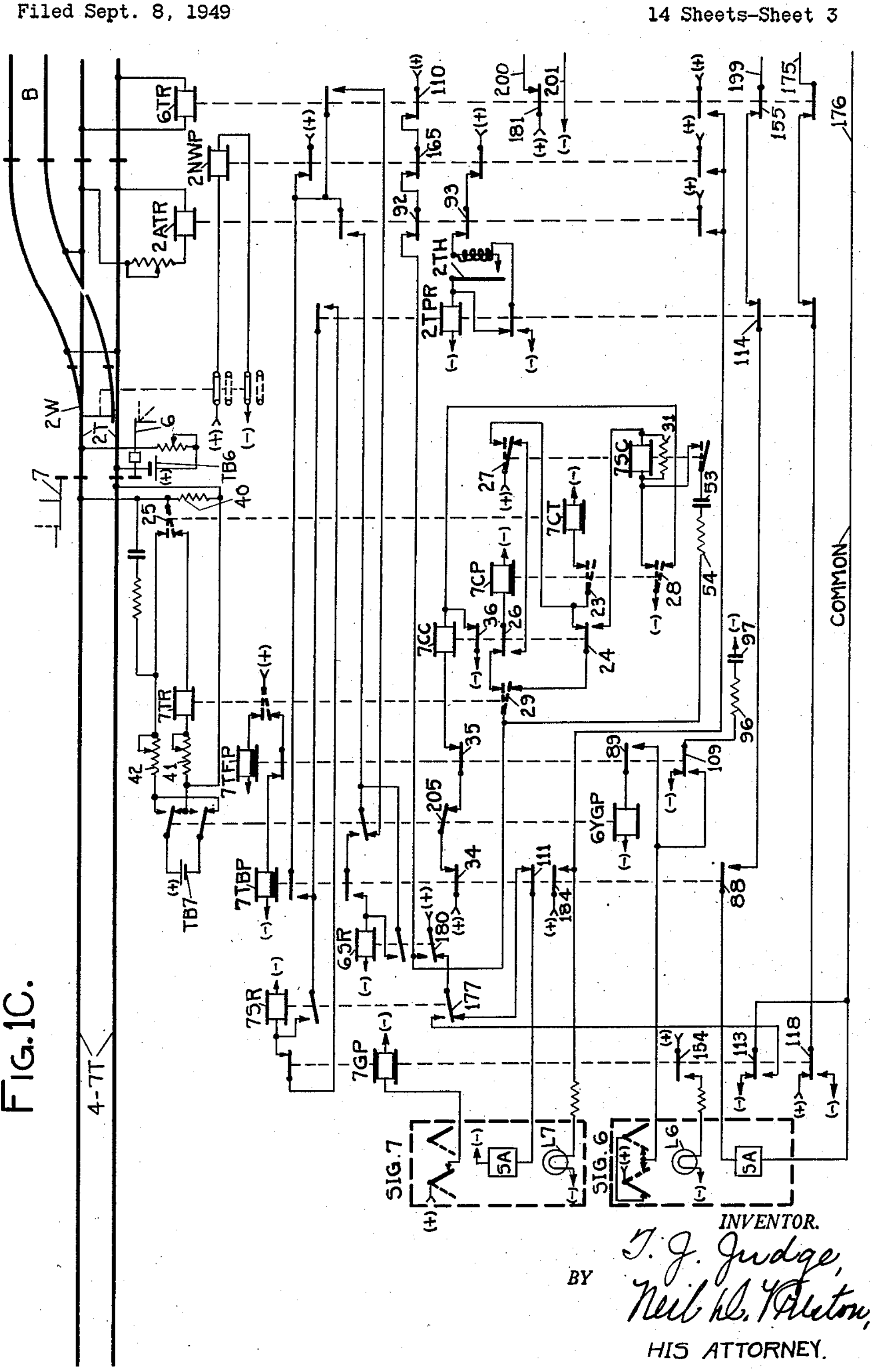
Figure 1D:
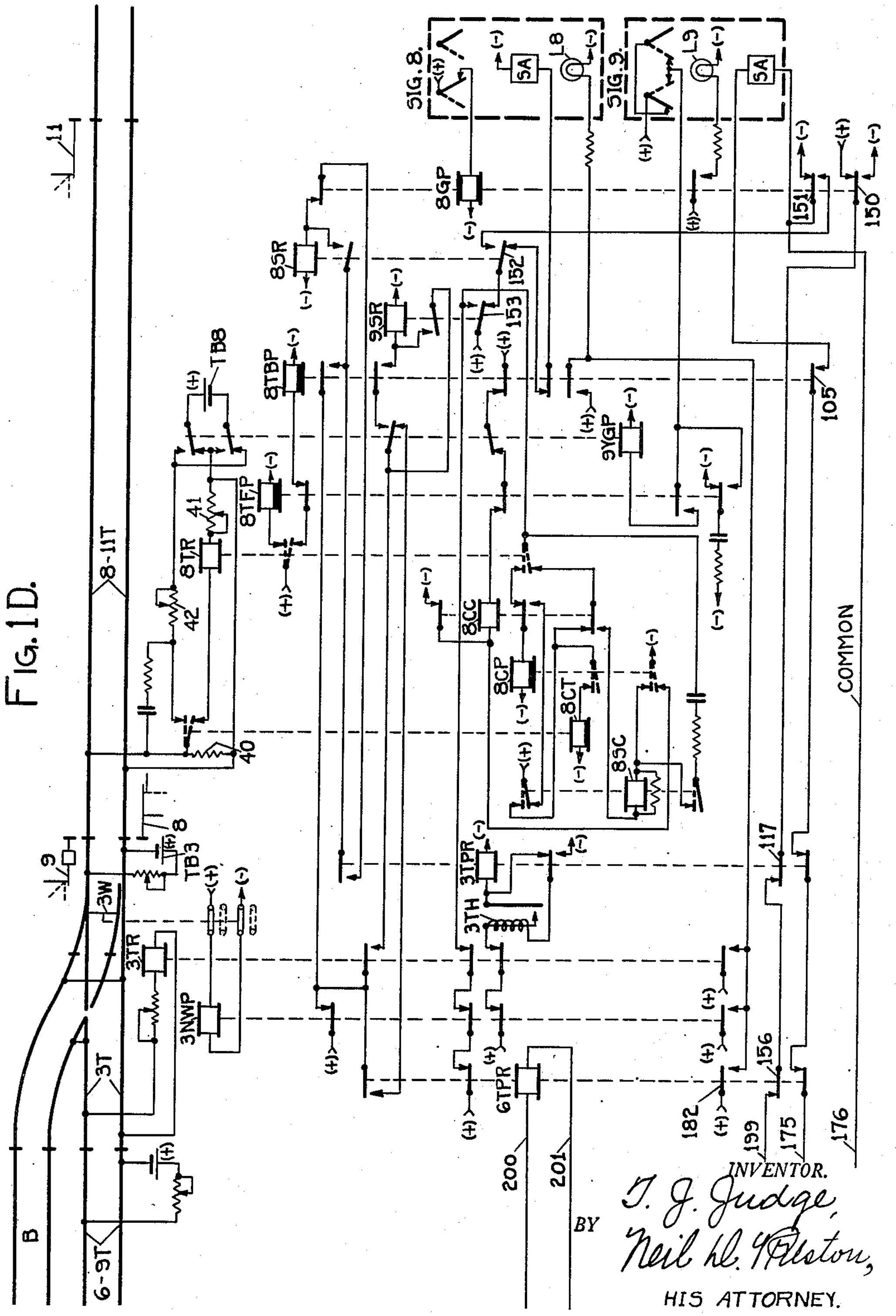

With reference to Figs. 1C and 1D, it will be seen that the signals 6 and 9 are interconnected by line wires through the siding section rather than providing special coded track circuit controls through this section.

As previously mentioned, polarized code pulses are employed in the approach track sections, such as 2–5T and 4–7T illustrated in Figs. 1A and 1C, respectively. These polarized code pulses are transmitted only in one direction, and for this reason polarized track relays are required at only one end of such track section. More specifically, polar track relays 5HTR and 5DTR are shown at the approach signal 5 and these relays are polarized in such a direction that their contacts pick up only when current flows through them in the direction indicated by the associated arrows. With this polarity arrangement, the relay 5DTR, for example, picks up only when the upper rail is positive.

Figure 2:
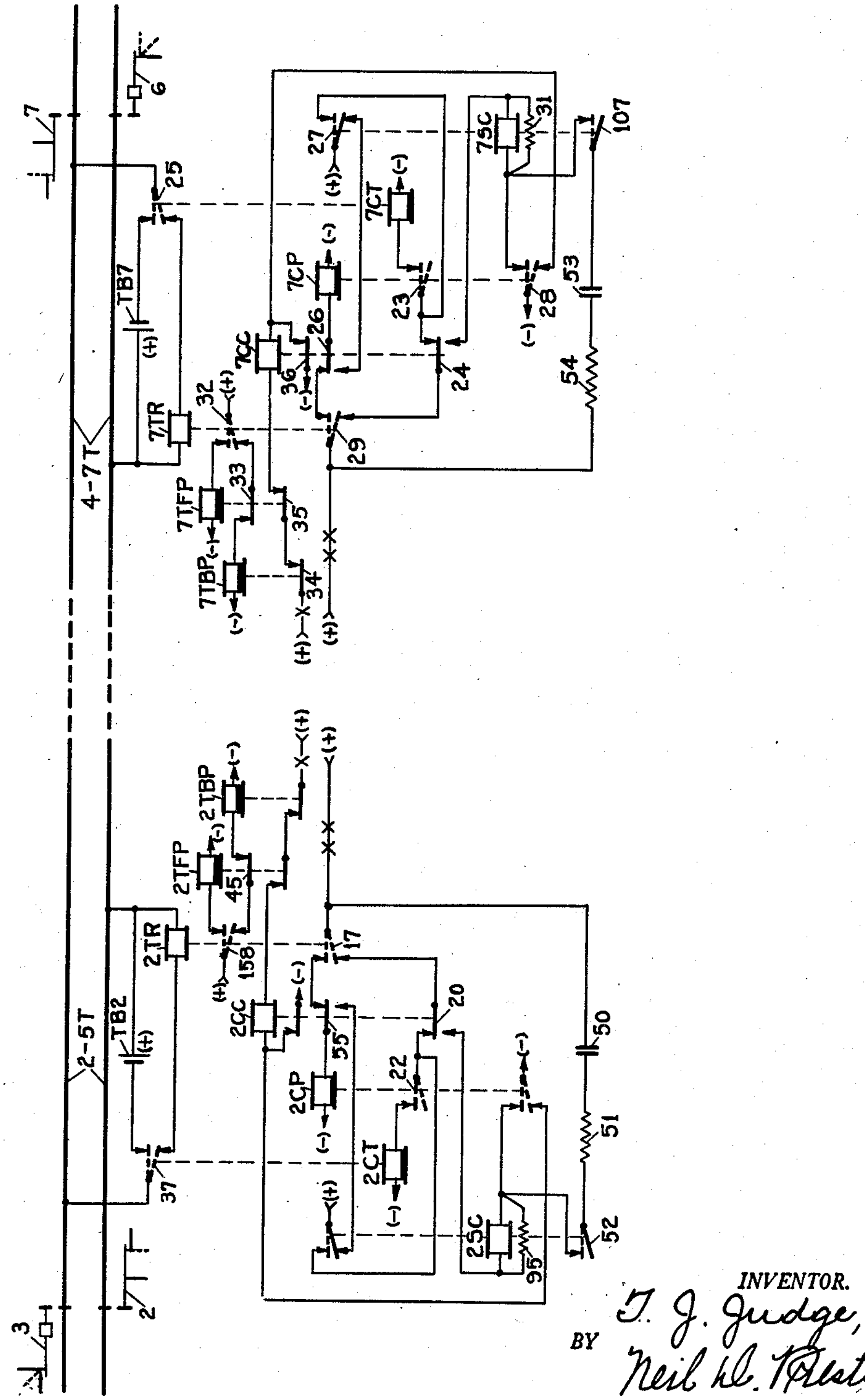
Fig. 2 is a simplified diagram of the present embodiment illustrating only those circuits which are effective in the self-coding operation.

Having thus given the general structural characteristics of the apparatus employed in the embodiment of the present invention, it is believed that the invention will be best understood by further description being given from the standpoint of operation. However, in this connection, since the relationship between the local self-coding and the station-to-station self-coding is rather difficult to understand when the code pulses are repeated through a plurality of track sections, it is believed expedient first to consider how these particular operations are effected in a single track section, and for this reason a simplified disclosure is provided in Fig. 2. For convenience in simplifying the illustration in this connection, this Fig. 2 shows only the coding apparatus and omits all signals, controls and the like. The relays shown for the opposite ends of this stretch of track have been given the same reference characters as the corresponding relays at the head block signal locations of signals 2 and 7. In other words, the operation is exactly the same as between these head block signal locations regardless of whether intervening insulated joints and repeater relays are included or not, except with respect to the periodicity of the station-to-station self-coding operation as will be presently apparent.

*Operation (Fig. 2)*

With reference to Fig. 2, it is noted that this illustration has been abbreviated to the extent that the various resistors and condensers which have been shown as being associated with the track relay and track battery in Figs. 1A and 1C, have been omitted from this figure for reasons of simplicity. Also, the pole-changing contacts of the circuit of the main form have been omitted because the polarity of the transmitted pulses is important only with respect to the operation of the corresponding intermediate signal but is not essential to the operation of the self-coding circuit organization.

The track battery TB7, track relay 7TR repeater relays 7TFP and 7TBP, together with the various relays 7SC, 7CT, 7CP and 7CC provide a circuit organization which is similar in nearly all respects to the circuit organization associated track relay 2TR at the opposite end of the section. The one exception is that the release time of the self-coding relay 7SC has been made somewhat longer than that of the corresponding self-coding relay 2SC at the other location to enable the local self-coding at each of these locations to occur at substantially different rates. Thus, a code fight is quickly resolved upon a shift from local self-coding to end-to-end self-coding conditions.

The explanation of the mode of operation of the present invention will be greatly facilitated by examining first the manner in which local self-coding occurs when the normal end-to-end self-coding has been interrupted due to the presence of a train in the associated track sections.

Referring to Fig. 2, when a train enters to shunt a track section, such as section 2–5T, both the track relays 2TR and 7TR, of course, remain deenergized. Consequently, the apparatus at both ends of the section assume conditions for local self-coding. Since this operation is similar at both ends, attention may be directed to the right hand end as typical. More specifically, back repeater relay 7TBP and front repeater relay 7TFP become deenergized. The front contacts of these relays 34 and 35, respectively, open the circuit for code-control relay 7CC which also drops away.

Since the back contact 26 of code-control relay 7CC is closed under this condition, the code repeater relay 7CP is energized through a circuit including back contact 27 of relay 7SC. When relay 7CP picks up, the closing of its front contact 28 provides a circuit to energize the self-coding relay 7SC from (+) through the various indicated selections not shown in detail in Fig. 2, back contact 29 of relay 7TR, back contact 24 of relay 7CC, windings of self-coding relay 7SC, front contact 28 of relay 7CP, to (−). As soon as self-coding relay 7SC picks up, however, the opening of its back contact 27 deenergizes relay 7CP and causes it to drop away. The opening of front contact 28 of code repeater relay 7CP deenergizes self-coding relay 7SC which in dropping away, again closes back contact 27 and causes code repeater relay 7CP to become energized. From this description it can be seen that code repeater relay 7CP and self-coding relay 7SC are alternately picked up and released. However, because of the slow release times of both self-coding relay 7SC and code repeater relay 7CP, both of these relays are in picked up positions for a brief interval during which time a circuit is closed to energize code transmitting relay 7CT. This circuit is closed from (−), through the windings of code transmitter relay 7CT, front contact 23 of code repeater relay 7CP, front contact 27 of self-coding relay 7SC, to (+). This circuit organization causes code transmitting relay 7CT to be intermittently energized. In response to each energization, it closes its front contact 25 so as to connect the track battery TB7 across the rails and thereby apply a pulse of energy to the track rails.

In considering this local self-coding operation attention should be directed to the characteristic control for the self-coding relays 2SC and 7SC. Each of these relays is of relatively high resistance so that it may be considered as a conventional quick acting relay. Referring to Fig. 2, it will be noted that the relay 7SC, for example, is shunted by a resistor 31, but this resistor is also of relatively high resistance and has little or no direct effect on the operation of the relay 7SC even though it is connected in parallel therewith. This resistor 31 is for the purpose of determining the release time of the relay 7SC in combination with the condenser 53 and resistor 54.

During the self-coding operation above described, each time the relay 7SC is picked up, its front contact 107 connects the condenser 53 and resistor 54 across the windings of this relay 7SC through back contacts 24 and 29 of relays 7CC and 7TR respectively. Thus, the condenser 53 is charged during the energized period of the relay 7SC subsequent to the closure of its front contact 107. This condenser 53 is of relatively high capacity but the resistor 54 is of relatively low resistance so that the charging of the condenser is effected within the energized period of the relay 7SC. The removal of energy from this multiple combination upon the opening of front contact 28 causes the condenser 53 to discharge through the windings of the relay 7SC and the resistor 31 in multiple for a time interval dependent upon the resistance-capacitance constants involved. In this way, the relay 7SC is made slow releasing. If it is desired to shorten the time interval, then the resistance 31 is reduced in value, but if the time interval is to be increased the resistance 31 is of course increased in value.

As above mentioned, the self-coding operation is made different at the two signal locations. This is effected by selecting the proper values for the resistors 95 and 31. For the purpose of the present disclosure, relay 7SC is made slower in releasing by the value of resistor 31 being made lower than the value of resistor 95.

In brief, it can be said that during the occupancy of the stretch of track of Fig. 2, the relays and circuits at signal locations 2 and 7 are in operation to place code pulses across the track rails at both locations. The pulses at one end are applied at a faster rate than at the other end; but since the train is present in the section and shunts the track rails neither end receives code pulses.

When the train leaves the stretch of track of Fig. 2, disregarding any other traffic conditions which might be involved in the main form shown in Figs. 1A, 1B, 1C and 1D, the pulses applied as a result of local self-coding at each end of the stretch are received at the opposite end. When these pulses are sufficiently time spaced with respect to each other, that end which first receives a code pulse subsequent to the departure of the train from the track section, immediately initiates a transfer operation from its local self-coding condition to a condition adapted for end-to-end self-coding operation. However, if the self-coding at the two locations occurs so as to cause pulses to be transmitted in opposite directions at the same time just subsequent to the departure of the train, it is obvious that neither location can actually receive a pulse, because its track relay is disconnected from the track rails. But since the self-coding operation is taking place at different rates at the two locations, the next subsequent transmission of a pulse will occur at one station prior to the other, so that a portion of a pulse is received at the other station, and thus effects the initiation of the transfer operation at that station. In brief, this is the reason why the rates at which local self-coding occurs at the two locations are made sufficiently different.

Let us assume that the track relay 7TR is the relay to first receive a code pulse of sufficient duration to cause it to be picked up, disregarding for the time being the particular time relations between the self-coding operations at the two locations. As soon as the front contact 32 of track relay 7TR is closed, its repeater relay 7TFP is energized causing it to immediately pick up and close its front contact 33. Thus, at the termination of this code pulse upon the release of the track relay 7TR, the back contact repeater 7TBP is picked up through a circuit including back contact 32 and front contact 33. This circuit is closed through front contact 33 because relay 7TFP is sufficiently slow acting to remain picked up between successive code pulses. It should also be noted that relay 7TBP is sufficiently slow acting as to remain picked up between successive off periods of a code. Thus, once these relays 7TFP and 7TBP are picked up in response to a code pulse and its following "off" period, they remain picked up until code pulses cease to be received.

Figure 3:
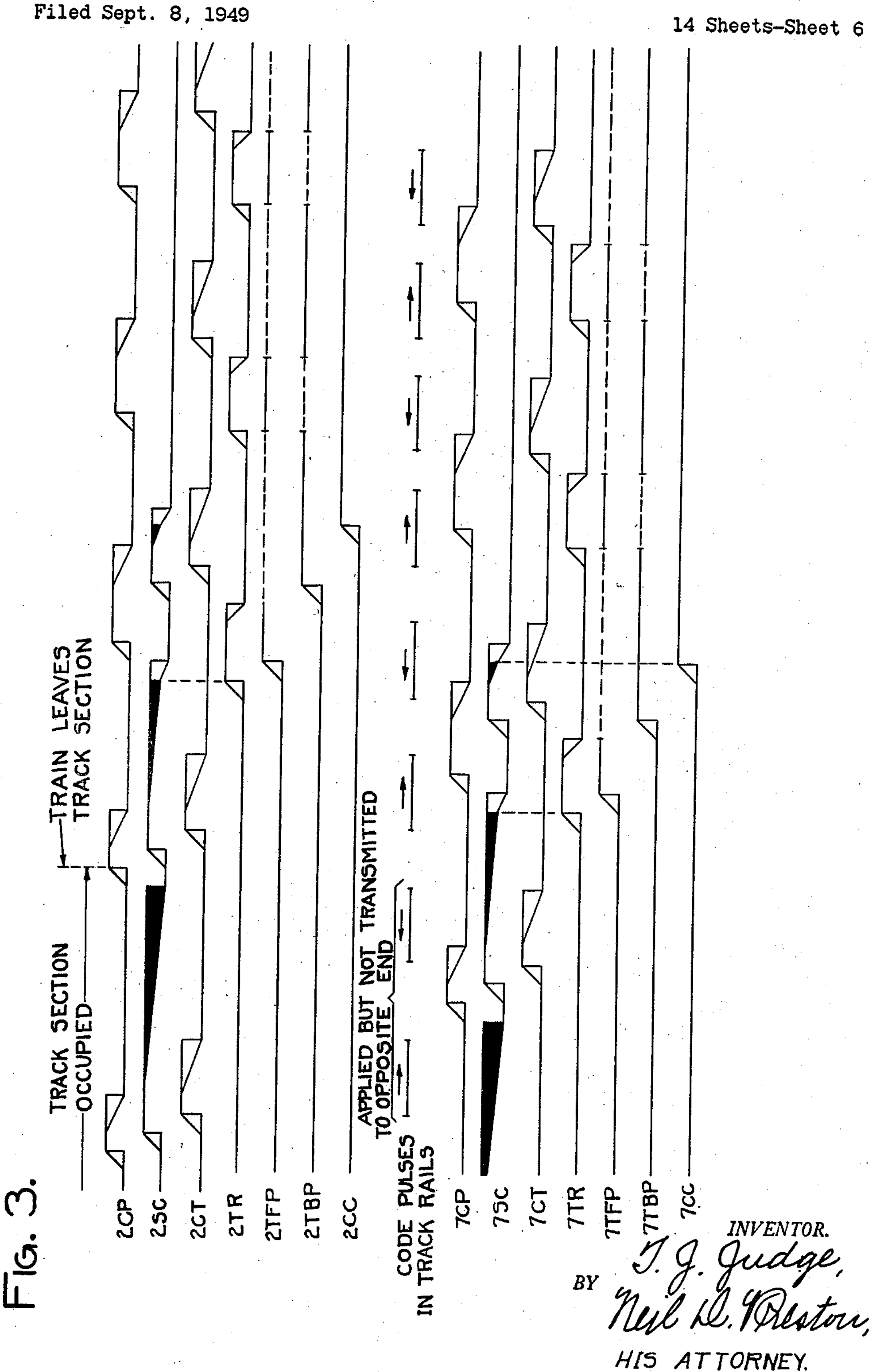
Fig. 3 illustrates a timing chart representing one possible sequence of relay operations occurring when the system transfers from local self-coding to end-to-end self-coding.

As above explained, the circuit connecting the condenser 53 across the self-coding relay 7SC includes back contacts 24 and 29 of relays 7CC and 7TR respectively. For this reason, as soon as the relay 7TR opens back contact 29 in response to the reception of a pulse following the departure of the train as indicated in Fig. 3, the relay 7SC is immediately caused to release, since both its energizing circuit and its holding circuit are opened at this time. This relatively quick release of the relay 7SC then closes the pick-up circuit for relay 7CP including back contacts 26 and 27 of relays 7CC and 7SC respectively. This condition maintains until the dropping of the track relay 7TR at the termination of the pulse being received. The release of the track relay 7TR completes the circuit for again picking up the relay 7SC which in turn opens the circuit for the relay 7CP at back contact 27.

However, while both of these relays 7CP and 7SC are picked up, a circuit is closed for the relay 7CT which causes it to pick up and effect the transmission of a code pulse from this location. In effect this is the same operation that occurs during a self-coding operation but it has occurred more quickly than it would have in the regular self-coding sequence of events because the picking up of the track relay 7TR cuts short the usual release time of the relay 7SC. It should also be noted that, with the front and back repeaters 7TFP and 7TBP both picked up, a circuit is closed for the code control relay 7CC as soon as the relay 7CP releases following this last mentioned energization of the relay 7SC. This circuit is closed from (+), through a circuit including front contact 34 of relay 7TBP, front contact 35 of relay 7TFP, windings of relay 7CC, back contact 28 of relay 7CP, to (—). As soon as the relay 7CC picks up and closes its front contact 36, negative energy (—) is connected to its right-hand terminal shunting out the back contact 28.

The picking up of the relay 7CC opens both the energizing circuit for the relay 7SC and its holding circuit including condenser 53. This means that the relay 7SC releases immediately and remains released so long as the front back repeaters 7TFP and 7TBP remain picked up, as illustrated in the sequence chart of Fig. 3. In this connection, the control for the relays 7CP and 7CT has now been transferred to the contact 29 of the track relay 7TR.

Before considering how the operation continues at this signal location in response to the reception of code pulses from the signal location 2, it may be well to consider what happens at such signal location 2 in response to the code pulses transmitted from this location, as just described.

Referring to Fig. 2 and also the diagram of Fig. 3, it will be apparent that the reception of the first pulse will be received by the track relay 2TR because it has been assumed that this location has been transmitting its pulses with a spaced relationship to the other location so that back contact 37 of relay 2CT is closed. The picking up of the track relay 2TR opens its back contact 17 which interrupts the releasing period of the relay 2SC then in progress and causes this relay to immediately drop away. At the same time, the front contact repeater 2TFP is also picked up so that the back contact repeater 2TBP can be picked up at the termination of this pulse being received by the track relay 2TR.

The release of the relay 2SC completes a circuit for the relay 2CP through back contacts of relays 2CC and 2SC in the same way as previously described for the other signal location. This picking up of the relay 2CP again conditions the circuit for energizing the relay 2SC at the termination of the pulse being received by the track relay 2TR. When this relay 2SC picks up, it completes the circuit for the relay 2CT which causes the transmission of a pulse from this location.

At the termination of the pulse being received by the track relay 2TR, the back repeater relay 2TBP is picked up which prepares the circuit for relay 2CC to be closed as soon as the relay 2CP releases following the picking up of the relay 2SC. As a result, the holding circuit for the relay 2SC is opened so that this relay immediately drops away.

This pulse just transmitted over the track rails while the relay 2CT is picked up, is repeated by the track relay 7TR at the other signal location by the picking up of the track relay 7TR. Since the relay 7CC is now picked up (as illustrated in Fig. 3), the relay 7CP is energized through a circuit including front contacts 26 and 29 of relays 7CC and 7TR respectively. At the termination of such pulse being received over the track rails, relay 7TR releases and closes back contact 29 which energizes the relay 7CT through a circuit including front contacts 23 and 24 during the release period of the relay 7CP. This energization of the relay 7CT causes a code pulse to be applied to the track rails and transmitted to the signal location at the opposite end of the stretch. By analogy to the above description, it will be seen that the reception of a code pulse at the signal 2 location results in the repeating of a pulse at the signal 7 location. Similarly, the reception of such pulse at the signal 7 location is effective to transmit a pulse from that location back to the signal 2 location. In brief, once the code control relays 2CC and 7CC are picked up, each location transmits a pulse each time it receives one and in this way causes pulses to transmit in opposite directions alternately between the two locations, as illustrated in Fig. 3.

In the above description, the operations have been considered in a general way as occurring under those conditions where the train leaves the stretch of track at a time when the local self-coding at the two locations is such as to transmit pulses from the respective locations at spaced intervals such as indicated in the diagram of Fig. 3, with the actual departure of the train occurring during the space between two pulses. This diagram has been drawn more particularly with the idea in mind of showing the sequence of events in the operation rather than showing any specific timing characteristics of the various relays, and for this reason arbitrary unit times have been selected for the preparation of the timing chart. In this diagram of Fig. 3, it has been assumed for convenience that the local self-coding at the signal 2 will take place at a rate having a ratio of "on" periods to "off" periods as four is to eleven; whereas, at the signal location 7 the local self-coding rate has been assumed to have a ratio of four to thirteen for the relation between the "on" and the "off" intervals respectively. In this diagram, the release time of the self-coding relays, such as relays 2SC and 7SC, has been shown heavy when it is being governed by a capacitor, but it has been shown in the outline when it is due to the electromagnetic characteristics of the relay. This is merely for convenience in the illustration so as to make it clear as to the operation of these relays.

Figure 4:
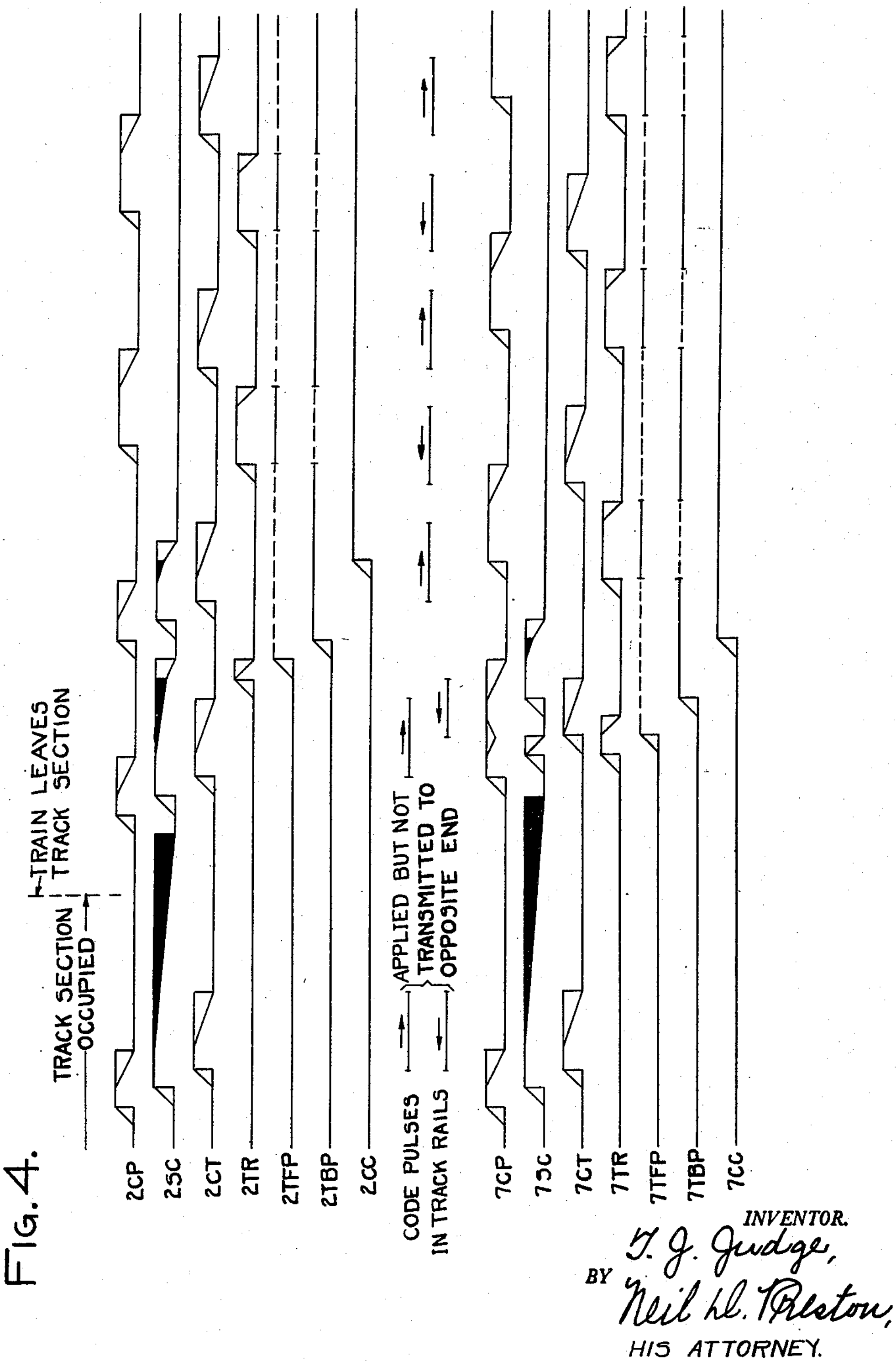
Fig. 4 illustrates a timing chart representing one possible sequence of relay operations occurring when the system transfers from local self-coding to end-to-end self-coding if the local self-coding at the two stations is taking place so as to cause the transmitted pulses to overlap at the time of the initiation of such transfer.

Since the local coding operation at the two signal locations is occurring at different rates, the time relation between the pulses applied to the track rails upon the leaving of a train from the track section will vary from time to time. However, the present invention has been so organized as to provide for a minimum of interference in code pulse transmission regardless of the particular time relationships existing at the time of departure of the train. As a matter of fact, the only time that an actual interference occurs is when one station is endeavoring to transmit a code pulse at substantially the same time that the other station is endeavoring to transmit a code pulse. In this case, as previously pointed out, neither track relay 2TR nor 7TR can receive a code pulse; but this condition can only exist for one pulse period. This last fact is illustrated in Fig. 4 where two code pulses are indicated as applied to the track section at the same time. Regardless of whether the train leaves the track section during the conflicting pulse periods or any time up to the next pulse transmission period, the occurrence of such next pulse produces the conditions which are effective to initiate the transfer operation. Thus, even under the most adverse conditions, the system is so organized as to resolve a code fight without the loss of more than one pulse, which means that the transmission of signalling conditions is immediately effective with substantially no loss of time.

As previously mentioned, Fig. 2 has been provided to illustrate the principles of the invention in its simplest form, and the timing charts of Figs. 3 and 4 have been constructed to illustrate a typical sequence of events under two different typical conditions assumed for Fig. 2. In the embodiment of the invention shown in Figs. 1A, 1B, 1C and 1D, code pulses are repeated from one track section to another between the head-block signal locations where local self-coding can take place. Thus, there are certain intervening operations which have not been considered in connection with the sequence charts of Figs. 3 and 4, but which will be discussed in connection with the complete system contemplated and illustrated in the Figs. 1A–1D.

*Operation (Figs. 1A, 1B, 1C, 1D)*

The manner in which the code pulses are repeated from one track section to another may be ascertained by referring to Fig. 1B. For example, at an intermediate signal location, such as signal 5, the way in which code pulses are repeated is dependent upon the direction from which the code pulses are received. Polarized code pulses are received from one direction while non-polarized code pulses are received from the opposite direction, but in both cases the repeated code pulses are non-polarized. In other words, the code pulses may be of either selected polarity in one track section but when such code pulses are repeated into the next track section the repeated pulses are always of the same polarity. Obviously, all pulses must have some polarity, but in this connection non-polarized means that the polarity is not selected or changed dependent upon traffic conditions.

More specifically, code pulses coming over the track section 2–5T will cause either track relay 5HTR or 5DTR to pick up depending upon the polarity of the applied code pulse. If the polarity of the code pulse is positive, i. e. the top track positive with respect to the bottom track, the track relay 5DTR will be picked up. Conversely, if the code pulses are of negative polarity, track relay 5HTR will be picked up because these relays are polarized as indicated by their respective symbols.

Assuming that track relay 5DTR is picked up due to the reception of positive code pulses, each closing of front contact 58 of this relay completes a circuit to energize code repeater relay 5CPP from (+), through back contact 56 of track relay 5TR, resistor 157, back contact 57 of track relay 5HTR, front contact 58 of track relay 5DTR, the windings of code repeater relay 5CPP, to (−). The closing of front contact 59 of code repeater relay 5CPP connects track battery TB5 across the rails of track section 5T. On the other hand, the reception of a negative code pulse by track relay 5HTR causes relay 5CPP to be energized through front contact 57 of relay 5HTR thereby repeating such negative pulse. Thus, each code pulse, regardless of its polarity is repeated into the adjoining track section 5T. It should be remembered, however, that the received code pulses, although polarized, are repeated as non-polarized code pulses.

Those various resistors associated with the track circuit 5T and track relay 5TR that are the same as described in connection with the track relay 2TR of Fig. 1A have been given the same reference characters. However, it will be noted that an approach track relay 5AR is included in multiple with resistor 22, and both are included in series with the track battery TB5 and its associated limiting resistor 42. The shunt resistor 22 is so adjusted in combination with resistor 42, that approach relay 5AR does not pick up during the application of code pulses unless a train is shunting the associated track section 5T.

When a code pulse is received in the opposite direction over the track section 5T, the picking up of track relay 5TR closes a circuit to energize relay 5CP from (+), through a circuit including back contact 58 of track relay 5DTR, back contact 57 of track relay 5HTR, resistor 157, front contact 56 of track relay 5TR, the windings of code repeater relay 5CP, to (−). The picking up of code repeater relay 5CP closes its front contact 80, thereby placing track battery TB10 across the rails of track section 2–5T to repeat the received code pulse.

It is noted that the reception of a pulse in either direction causes the picking up of a repeater relay 5CP or 5CPP to effect the transmission of a corresponding pulse in the same direction in the next track section. The repeating relay in each case is made slightly slow releasing, so that it will exactly reproduce the pulse it is repeating because otherwise the pick up time of the relays tends to be longer than their release times. In this same connection, the resistor 157 is used to compensate for the relatively low resistance in the relay windings, because these relays are wound with as few turns as possible to keep their inductance at a minimum and thus reduce their pick up times.

Also, it can be seen that relays 5CP and 5CPP are controlled by an interlocked circuit such that the simultaneous reception of pulses by both track relays 5TR and 5HTR or 5DTR results in neither pulse being repeated. This action is involved in the resolution of certain code fight conditions later discussed.

If the stretch of single track between two intermediate signal locations is of such a length as to make it desirable that it be divided into two separate track sections, code pulses may be relayed or repeated around the insulating joint at the junction of these adjoining track sections by using a relayed cut-section of the type illustrated in Fig. 1B. Reference to this drawing shows that a code pulse received over the track section 5T will, unless a pulse is simultaneously being received from the opposite direction, cause code repeater relay 5CCP to be energized. The closing of its front contact 60 places track battery TB11 across the rails of track section 4T for the duration of the code pulse being repeated. Similarly, the reception of a code pulse from the opposite direction will cause code repeater relay 4CCP to be picked up, and the closing of its front contact 61 will cause track battery TB12 to be placed across the rails of track section 5T for the duration of the code pulse being repeated. In this manner, each received code pulse is directly repeated into the adjoining track section.

Code pulses are repeated from the track section 4–7T into the track section 4T at the intermediate signal 4 in a similar manner as explained for the operation at the intermediate signal 5. In this instance, the polarized pulses are received over track section 4–7T and are repeated as neutral pulses into the track section 4T.

With the above understanding of the manner in which code pulses are repeated past insulated joints between adjoining track sections, the manner in which the system normally operates to transmit self-coding pulses from one end of the stretch to the other in opposite directions alternately between head-block signals 2 and 7 may now be considered. The particular manner in which the self-coding condition is initiated following the passage of a train will be considered in detail later, it being sufficient for the present to know that it is effected in general as described above in connection with Fig. 2.

*Normal conditions*

Figures 5A, 5B, 5C, 5D:
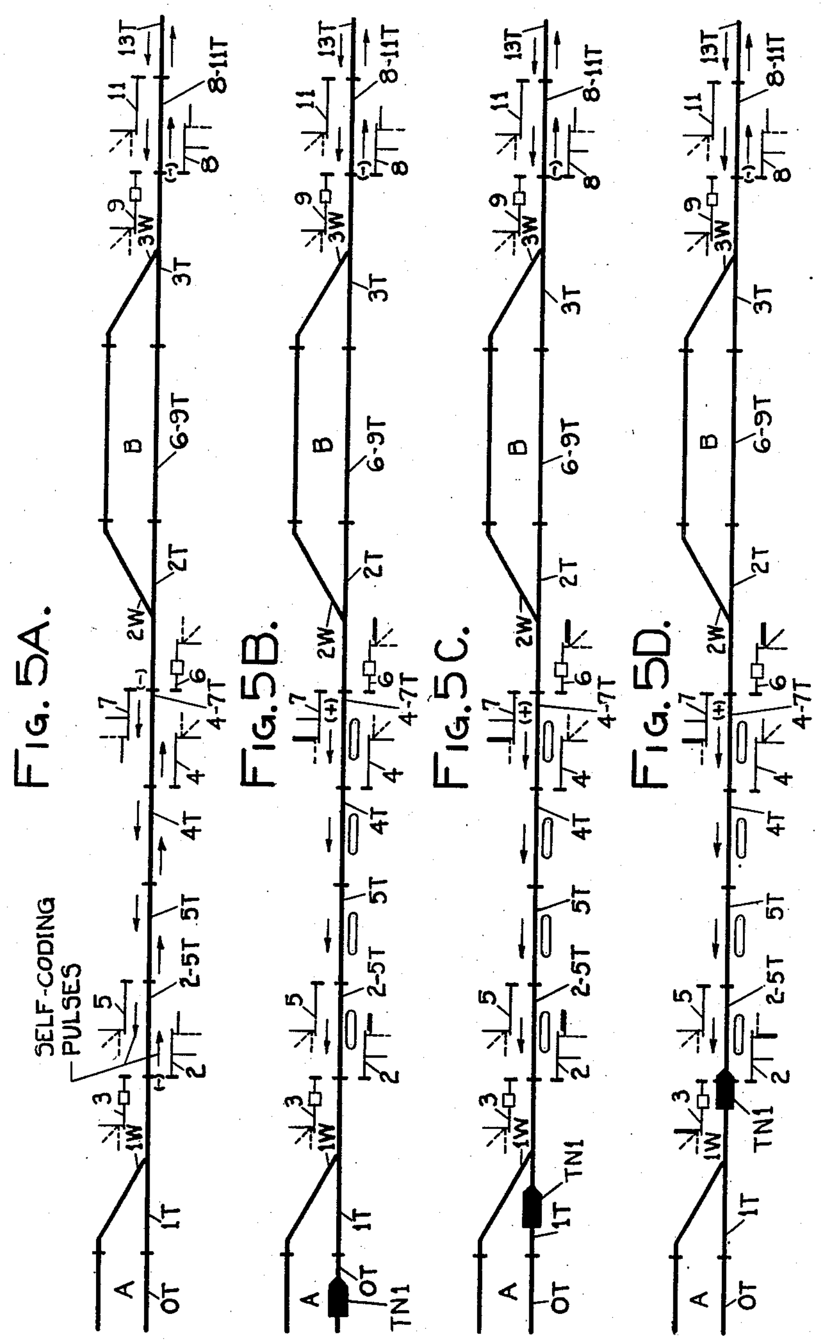

With the normal self-coding conditions maintained as graphically illustrated in Fig. 5A of the drawings, it will be apparent that the track relay 2TR at the west end of the stretch intermittently receives a code pulse. The reception of these pulses operates contact 158 of relay 2TR so as to intermittently energize the relay 2TFP. Since relay 2TFP is slow in releasing, its contact 45 remains in a picked up position between successive pulses. This causes the back contact repeater 2TBP to be energized each time the track relay 2TR is dropped away. This relay 2TBP is likewise slow in releasing and remains picked up between successive pulses. Thus, as long as the self-coding pulses intermittently operate the track relay 2TR, these relays 2TFP and 2TBP are maintained picked up.

The signal 3 is normally at stop because of open back contact 69 on relay 2TBP; and with the relay 2TFP picked up, open back contact 101 further insures that the relay 3YGP is deenergized. Thus, the code control relay 2CC is maintained energized through a stick circuit closed from (+), and including front contact 160 of relay 2TBP, back contact 161 of relay 3YGP, front contact 162 of relay 2TFP, windings of relay 2CC, front contact 163 of this relay 2CC, to (−). It is of course understood that this relay 2CC has been picked up at the beginning of the end-to-end self-coding while relay 2CP was released.

With the relay 2CC normally picked up, each time the track relay 2TR picks up, the relay 2CP is energized through a circuit closed from (+), and including front contact 145 of relay 0TPR, front contact 164 of relay 1NWP, front contact 117 of track relay 1TR, front contact 17 of track relay 2TR, front contact 55 of relay 2CC, windings of relay 2CP, to (−). This energization of the relay 2CP is maintained throughout the reception of a code pulse as repeated by the track relay 2TR and for a limited time thereafter as determined by its slow releasing characteristics. Thus, at the end of such a pulse, the track relay 2TR drops away and completes the energizing circuit for the relay 2CT from (+), through a circuit including front contact 145 of relay 0TPR, front contact 164 of relay 1NWP, front contact 117 of relay 1TR, back contact 17 of track relay 2TR, front contact 20 of relay 2CC, front contact 22 of relay 2CP, windings of relay 2CT, to (−). This energization of the code transmitter relay 2CT causes the closure of its front contact 37 to apply a code pulse to the track section 2–5T from the battery TB2. In view of the above description, it can be seen that the reception of each pulse from the other headblock signal causes a return pulse under the normally self-coding operation.

This pulse applied to the track section 2–5T is repeated past the insulated joints at the signal 5, as previously described. The repeated pulse in the track section 5T is repeated past the intermediate cut section and into the track section 4T, which in turn causes a repeat pulse to be applied to the track section 4–7T at the signal 4.

Referring to Fig. 1C, it will be noted that the reception of the self-coding pulses by the track relay 7TR causes the relay 7TFP and 7TBP to be maintained picked up. Also, the relay 7CC is normally energized through its stick circuit (described in connection with Fig. 2) which is similar to the stick circuit pointed out in connection with the code controlling relay 2CC in Fig. 1A.

Thus, each time the track relay 7TR is picked up, the relay 7CP is energized through a circuit closed from (+) and including front contact 110 of track relay 6TR, front contact 165 of relay 2NWP, front contact 92 of track relay 2ATR, front contact 29 of track relay 7TR, front contact 26 of relay 7CC, windings of relay 7CP, to (−). This energization of the relay 7CP is maintained throughout the reception of the pulse by the track relay 7TR and its contacts are held picked up for a limited time thereafter in accordance with the slow releasing characteristics of this relay 7CP. Thus, upon the end of such a pulse and the release of track relay 7TR, a circuit is closed for energizing the relay 7CT from (+), through a circuit including front contact 110 of track relay 6TR, front contact 165 of relay 2NWP, front contact 92 of track relay 2ATR, back contact 29 of track relay 7TR, front contact 24 of relay 7CC, front contact 23 of relay 7CP, windings of relay 7CT, to (−). This energization of relay 7CT is maintained only for a limited time determined by the release time of the relay 7CP and its own releasing characteristics, it being understood that the total time that the relay 7CT is picked up closing its front contact 25 corresponds to the proper time alotted for a code pulse period.

Each pulse transmitted from the signal location 7 over the track section 4–7T is repeated into the track section 4T at the signal location 4 analogous to the description previously given, and similarly, the repeated pulse in the track section 4T is repeated into the track section 5T, so that the apparatus at signal 5 can in turn repeat a pulse into the track section 2–5T. In this way, it will be understood that the pulses are transmitted alternately back and forth in opposite directions through the stretch of track as indicated in the Fig. 5A.

At the intermediate signal location 5, the operation of the track relay 5TR intermittently closes its front contact 75 so that the relay 5TP is intermittently energized. Since this relay 5TP has slow releasing characteristics, its contacts remain picked up so long as these code pulses are intermittently received. For this reason, back contact 76 is open and prevents the energization of the lamp L5 of signal 5. Likewise, the open condition of back contact 79 of this relay 5TP prevents the intermittent energization of the track repeater relay 5HTP as the track relay 5HTR is intermittently operated in response to the self-coding pulses as they are received at this east end of the track section 2–5T. Consequently, the mechanism SA of signal 5 is normally deenergized. Likewise, at the signal 4 location, the intermittent operation of the track relay 4TR causes the intermittent energization of the repeater relay 4TP which in turn prevents the illumination of the signal 4 and prevents the actuation of the repeater relay 4HTP associated with the relay 4HTR as it is intermittently operated in response to the self-coding pulses, all in a manner as just described in connection with the repeating relay 5TP. For this reason, signal 4 is deenergized and its lamp L4 is not illuminated.

At each headblock signal location, the leaving signal is normally controlled or operated to a clear position although it is not illuminated until a train approaches. For example, the signal 2 in Fig. 1A has its mechanism SA normally energized from (+), through a circuit including back contact 62 of directional stick relay 3SR, back contact 63 of directional stick relay 2SR, front contact 64 of relay 2TPB, windings SA, to (−). A similar circuit is provided for the headblock signals 7 and 8.

These normal conditions of the system place it in readiness for the passage of traffic, either from the beginning of the territory thus signalled or from some siding, such as sidings A, and B, and the like.

Before considering the protection afforded various typical train movements by the signalling system of the present invention, it is believed convenient to first consider the manner in which the directional stick relays at the headblock signals are controlled in accordance with the direction of train movements.

*Directional stick relay control*

Two directional stick relays, such as relays 2SR and 3SR of Fig. 1A, are provided at each headblock signal location for the purpose of effecting certain conditional controls to facilitate following train movements in spite of the over-lap control provided to give protection in the case of opposing train movements, as will be later explained.

More specifically, let us assume that an east bound train is approaching the headblock signal 2 over the track section 0T. This deenergizes the track relay 0TR for the track section 0T which in turn by the opening of its front contact 14 deenergizes its repeater relay 0TPR. The relay 0TR is of course at the other end of the siding A and controls the relay 0TPR over the line wires 12 and 13, in a similar manner as shown in Figs. 1C and 1D for the relay 6TPR. The deenergization of the repeater relay 0TPR closes back contact 116 energizing the lamp L2 of signal 2 over an obvious circuit. This illumination of the absolute signal 2 causes it to display its proceed aspect to the approaching train so that it may proceed into the single track stretch.

The presence of the east-bound train in the track section 0T also causes the opposing signals to be placed at stop. As above explained, the opposing signal 3 is normally at stop because of open back contact 69 of relay 2TBP; but even if a west-bound train were approaching the signal 3 and back contact 69 was closed, the signal 3 is held at stop by reason of open front contacts 112 of relay 0TR and 170 of relay 0TPR. The remaining opposing signals to the rear of signal 3 are held at stop by reason of the removal of the coding pulses being transmitted from this headblock signal location over the track section 2–5T. This condition is caused by the open front contact 145 of the relay 0TPR. The opening of front contact 171 of relay 0TPR causes the signal to the rear of signal 2 to be held at stop. With these conditions established upon the approach of the east-bound train, it is apparent that its entrance into the track section 1T causes these conditions to be continued. This is because the deenergization of the track relay 1TR opens front contact 117 to prevent the transmission of code pulses from this signal location and closes the back contact 30 to continue the illumination of signal 2. In addition, the opening of front contact 119 of relay 1TR deenergizes its repeating stick relay 1TPR. The opening of its front contact 83 insures that the signal 3 is continued to be held at stop; while the opening of its front contact 172 continues to hold the next signal in the rear at stop.

The closure of back contact 21 of this detector track repeating relay 1TPR prepares a pick-up circuit for the directional stick relay 2SR which is closed as soon as the train passes the signal 2 and enters the track section 2–5T thereby preventing the reception of code pulses over that track section. More specifically, the entrance of the east-bound train into the track section 2–5T causes the track relay 2TR to cease operation resulting in the sequential release of its repeater relays 2TFP and 2TBP. As soon as this occurs, a pickup circuit is closed for the directional stick relay 2SR from (+), and through a circuit including front contact 91 of relay 1NWP, back contact 90 of relay 2TBP, back contact 21 of relay 1TPR, front contact 94 of relay 2GP, windings of relay 2SR, to (−). As soon as the relay 2SR picks up, it closes front contact 99 shunting the contacts 21 and 94 so that it is maintained energized until code is again received at this signal location, unless the switch 1W is reversed to allow a following train movement.

It should be noted in this connection that as soon as the train enters the track section 2–5T and causes the release of relay 2TBP, the opening of front contact 64 causes the signal 2 to be operated to its stop position. This in turn deenergizes the relay 2GP, but this relay 2GP is sufficiently slow in releasing that the relay 2SR may be picked up following the closure of back contact 90 before the front contact 94 of relay 2GP is opened. In this way, the directional stick relay 2SR is picked up by a temporarily closed circuit when a train actually moves past the signal 2, and is held up through its stick circuit until such train moves beyond the control of the associated signal, as will be later explained. The manner in which this directional stick relay 2SR causes the signal to the rear to display a caution indication will be discussed later.

The directional stick relay 2SR is not picked up by a train which passes the signal 2 when that train leaves the siding A because, under such circumstances, the train is usually travelling at such a low speed that it is unnecessary to provide a conditional control to the rear for allowing a following train to more closely approach such train leaving the siding.

More specifically, let us assume that a train is standing on the siding A and desires to pass into the single track stretch past the leaving signal 2. The trainmain notes that the signal 2 is not illuminated which indicates that no train is approaching in either direction and thus he may operate the track switch 1W to its reverse position without endangering any main line train movement. This operation of the switch 1W causes the switch box contacts to be operated to deenergize the normal switch box repeater relay 1NWP. Consequently, the closure of back contact 108 which completes the energizing circuit for the lamp L2 of signal 2 and advises the trainman as to whether the single track stretch in advance is in condition to allow his train to proceed.

The opening of front contact 164 of relay 1NWP causes the deenergization of the code transmitting relays and stops the transmission of code pulses away from this signal 2 and thus holds all opposing signals at stop. The opening of front contact 166 of relay 1NWP causes the deenergization of the track repeater relay 1TPR which in turn opens front contact 83 to hold the signal 3 at stop and also opens front contact 172 to hold the next signal in the rear of signal 2 at stop.

Although the closure of back contact 21 of relay 1TPR prepares the pickup circuit for the directional stick relay 2SR the same as for the train movement over the main track, front contact 91 of relay 1NWP is now open and positively prevents the picking up of relay 2SR. Thus, the passage of this train from the siding A over the track section 1T and into the track section 2–5T causes the signal 2 to be operated to stop and releases the relay 2GP opening contact 94 before the contact 91 can again be closed after the train has wholly past into the main track. In other words, the trainman at the rear of the train restores the track switch 1W to its normal position before his train continues on its way along the main track, but the time for this complete train movement into the main track is much greater than is required for the release of the relay 2GP following the automatic operation of the signal 2 to its stop position.

Both in the case of the east-bound train movement over the main track and the east-bound train movement from the siding A onto the main track, the deenergization of the stick relay 1TPR is effected. This relay 1TPR and the associated thermal relay 1TH are primarily provided because the detector track section 1T is relatively short, and it would be possible for a short fast train to pass through this track section 1T so quickly that the track relay 1TR and its associated relays would not have time in which to operate and register the condition of occupancy for the passing train. This is particularly the case in connection with main line train movements. For this reason, the thermal relay 1TH is provided and acts to delay the energization of the relay 1TPR after it has once been released until a definite predetermined period of time has elapsd following the preparation of its operating circuit. For example, let us assume that a train is moving over the main track, with the relay 1NWP normally energized. The opening of front contact 119 of relay 1TR deenergizes relay 1TPR. When this train passes beyond the detector track section 1T, the relay 1TR is reenergized closing an energizing circuit for the thermal relay from (+) and including front contact 166 of relay 1NWP, front contact 119 of relay 1TR, windings of thermal relay 1TH, back contact 167 of relay 1TPR, to (−). After a time measured by the thermal relay 1TH, its contact 168 is closed completing an obvious pick-up circuit for the relay 1TPR. When the relay 1TPR picks up, it opens back contact 167 and deenergizes the thermal relay 1TH below its operating value, but the front contact 167 of relay 1TPR closes the stick circuit which also includes the winding of thermal relay 1TH. The current in this stick circuit is considerably below the operating current for the thermal relay so that the thermal contacts readily restore to their normal positions. It will thus be seen that although a fast short train might quickly pass through the track section 1T, the closure of back contact 21 of relay 1TPR is assured for sufficient time to allow for the picking up of the directional stick relay 2SR and also to allow for the proper operation of the signal controls over the line wires 66, 67, and 68. Also, the inclusion of this arrangement with the control by relay 1NWP assures that a momentary operation of the switch will perform a deliberate operation of the signal control.

Let us now consider the manner in which the passage of a west-bound train results in the picking up of directional stick relay 3SR. Obviously, when a west bound train occupies the track section 2–5T, the track relay 2TR is shunted and code pulses cannot be received at this signal location. For this reason, the repeater relays 2TFP and 2TBP will be dropped away. The closure of back contact 69 causes the signal 3 to be controlled in accordance with traffic conditions in advance, and assuming that they are proper, this signal 3 will be operated to a proceed condition. Its lamp L3 is energized through back contact 65 at this time because the open condition of front contact 64 of relay 2TBP causes the signal 2 to be held at stop.

Also, the closure of back contact 183 of relay 2TBP causes signal 2 to display a stop aspect and thereby advise a train standing on siding A of the approach of this west-bound train.

Since the signal 3 is assumed to be indicating a proceed aspect, its repeater relay 3YGP is energized by reason of a circuit closed by (+) and including contact 100 of signal 3 in a right hand position, back contact 101 of relay 2TFP, windings of relay 3YGP, to (−). The passage of the west-bound train into the detector track section 1T of course causes the track relay 1TR and its associated repeater relay 1TPR to drop away. Immediately upon the closure of back contact 173 of track relay 1TR, the directional stick relay 3SR is energized from (+) over a circuit including front contact 91 of relay 1NWP, back contact 173 of track relay 1TR, front contact 103 of relay 3YGP, back contact 104 of relay 2TBP, windings of relay 3SR, to (−). As soon as this directional stick relay 3SR closes its front contact 107, it is provided with a stick circuit which is dependent upon the back contact 173 of the track relay 1TR.

The release of the track relay 1TR and its repeater relay 1TPR opens front contact 83 which of course causes the signal 3 to go to stop and deenergizes the relay 3YGP; but this relay 3YGP is slow in releasing since it is short-circuited under this circumstance in series with condenser 48 and resister 49 through contacts 101 and 174 of relay 2TFP. This release time of the relay 3YGP is sufficient for the picking up of the relay 3SR. In brief, relay 3YGP remains picked up for a brief interval after the first train enters the track section 1T so as to enable the directional stick relay 3SR to be picked up. The stick circuit for relay 3SR initially includes back contact 173 but when the relay 3YGP releases a stick circuit is closed including back contact 212 of relay 0TPR and back contact 103 of relay 3YGP.

When the rear end of the west-bound train passes out of the track section 2–5T and into the track section 1T, code pulses may again be received at the signal 2 causing the repeater relays 2TFP and 2TBP to be picked up. However, the directional stick relay 3SR is maintained energized by a stick circuit including its own front contact 107 and back contact 173 of relay 1TR. This energization of the directional stick relay 3SR continues the open condition of its back contact 62 preventing the signal 2 from clearing, except under circumstances later described. Assuming that the train is passing over the main track, the track relay 0TR and its repeater relay 0TPR are both dropped away by the presence of the train. Thus, back contact 212 of the relay 0TPR closes before the back contact 173 of the track relay 1TR is picked up. Thus, an alternate stick circuit for the directional stick relay 3SR is provided, and will be deenergized only when the west-bound train passes out of the track section 0T.

Because of open front contact 91, the directional stick relay 3SR is not picked up when a west-bound train enters the siding A instead of traveling along the main track. Thus, as explained above, the switch 1W must be in its normal position and its normal repeater relay 1NWP picked up in order that either of the directional stick relays 2SR or 3SR may be picked up.

*Control of codes to govern signals*

As previously described, the signaling system of the present invention employs polarized codes in certain track sections and neutral impulses in other track sections; and the codes in the adjoining track sections for the same directions are made dependent upon each other in such a way as to effect the proper signal controls over the various stretches of single track. Also, the various code conditions are effective to provide certain overlap and double distant controls through the siding sections by employing line wires. Therefore, it is deemed advisable to discuss at this point the manner in which the presence of trains affects the transmission of code pulses to govern the signals under various traffic conditions.

First let us consider that an east-bound train enters track section 0T and intends to proceed in accordance with train order instructions over the main track through the signal territory including that illustrated in the drawings of Figs. 1A, 1B, 1C and 1D.

When the east-bound train enters the track section OT, the track relay OTR and its repeater relay OTPR are dropped away as previously explained. The release of relay OTPR opens front contact 145 and thus removes energy from the circuit to the various coding relays. No code pulses can, therefore, be transmitted eastward over the track section 2–5T from this headblock signal location when an east-bound train is occupying the track section OT. This cessation of code transmission from this signal location, is repeated through each of the track sections in the single track stretch so that the track relay 7TR at the opposite end of the stretch is no longer operated. However, although code pulses are no longer received at the signal 7, a local self-coding operation is immediately instituted involving the operation of the relays 7CP, 7SC and 7CT. This result is accomplished because the absence of code pulses to operate the track relay 7TR results in the dropping away of relays 7TFP and 7TBP. Therefore, front contacts 34 and 35 open and deenergize the code control relay 7CC. Consequently, code pulses originating at the signal 7 as self-coding pulses are transmitted through the stretch toward the signal 2 even though no code pulses are received at the signal 7. This condition has been indicated by the symbols in Fig. 5B.

Failure to receive code pulses over track section 4–7T at the signal 7 causes the signal 7 to be operated to a stop position by reason of the opening of front contact 111 of relay 7TBP, while the closure of back contact 184 causes this signal 7 to be illuminated. As a result, the relay 7GP becomes deenergized, illuminating the signal 6 by the closure of back contact 154 and removing energy from the line wires 175 and 176. Even though back contacts 113 and 118 are now closed, negative energization cannot be applied to the line wire 175 because of the open condition of front contact 177 of stick relay 7SR. The manner in which this condition provides the overlap control and effects a double distant caution will be discussed later.

The self-coding pulses transmitted from the signal 7 over the track section 4–7T are of positive polarity as indicated in Fig. 5B. Therefore, the operation of the track relay 4DTR causes the relay 4DTP to be intermittently energized because the cessation of east-bound pulses allows the track repeating relay 4TP to become deenergized. In brief, this condition establishes an intermittently closed circuit for relay 4DTP from (+), and including back contact 185 of relay 4TP, back contact 186 of relay 4HTR, front contact 187 of relay 4DTR, windings of relay 4DTP, to (−). This intermittent energization of relay 4DTP causes it to maintain its contacts picked up in part preparing the circuit for winding SA of the signal 4. However, since the approach relays 4AR and 4APR are not yet picked up, the relay 4AP is deenergized and the signal 4 is not operated. Also, the opening of back contact 188 of relay 4DTP prevents the energization of the lamp L4 although the back contact 189 of relay 4TP is closed.

The reception of positive pulses by the track relay 4DTR of course repeats such pulses into the track section 4T. In a similar manner, as described before, these pulses are repeated from section to section to the signal 2 to maintain it in a proceed operated position.

When the east-bound train causes track relay 1TR to drop away, the opening of its front contact 117 also opens the circuit to the coding relays. There is, therefore, no change in the code control at this signal location with this advance of the train which has been indicated in the diagram of Fig. 5C. It is assumed, of course, that the switch 1W is in its normal position so that the switch repeater relay 1NWP is picked up.

As soon as the east-bound train has wholly passed into the track section 2–5T as indicated in Fig. 5E, track relay 1TR again picks up closing front contact 117. With both of the contacts 145 and 117 restored to closed positions, self-coding is again instituted at this signal 2 location. Thus, code pulses are applied to the track rails in the rear of the train, but because of the shunting effect of the train they are not received at the signal 5. Likewise, code pulses are being received at the front of the train, but because it is shunting the track rails, they are not received by the signal 2. This condition has been indicated in Fig. 5E.

When the east-bound train has completely passed from the track section 2–5T into the track section 5T, code pulses will be received at this signal 5 location so as to cause either the track relay 5HTR or the relay 5DTR to be picked up depending upon the polarity of the applied code pulses.

In the absence of any following train, the code pulses in the rear of the train when it is in the track section 2–5T will be of positive character because the signal 3 is controlled to a clear condition resulting in the energization of relay 3YGP since the track relay 2TR is not receiving code pulses and the relay 2TFP is deenergized. These code pulses are repeated into the track section 5T, but due to the presence of the train they are not transmitted into the track section 4T until the train has passed beyond the intermediate cut-section and ceases to shunt the relay 5CCP.

When the train passes into track section 4–7T, the code pulses from track section 4T are likewise repeated into section 4–7T but are ineffective because of the shunting of the track rails by the train. In this manner, code pulses may be said to follow the train in that code pulses are transmitted in an east-bound direction and repeated from section to section as the train passes through the stretch of single track but because of shunting effect of the train, these code pulses cannot be repeated into the track sections ahead of the train. Similarly, these code pulses in advance of the train and originating at the signal 7 are transmitted right up to the front of the train, but because of its shunting effect these pulses cannot be received in the track sections in the rear of the train.

Figures 5E, 5F, 5G, 5H:
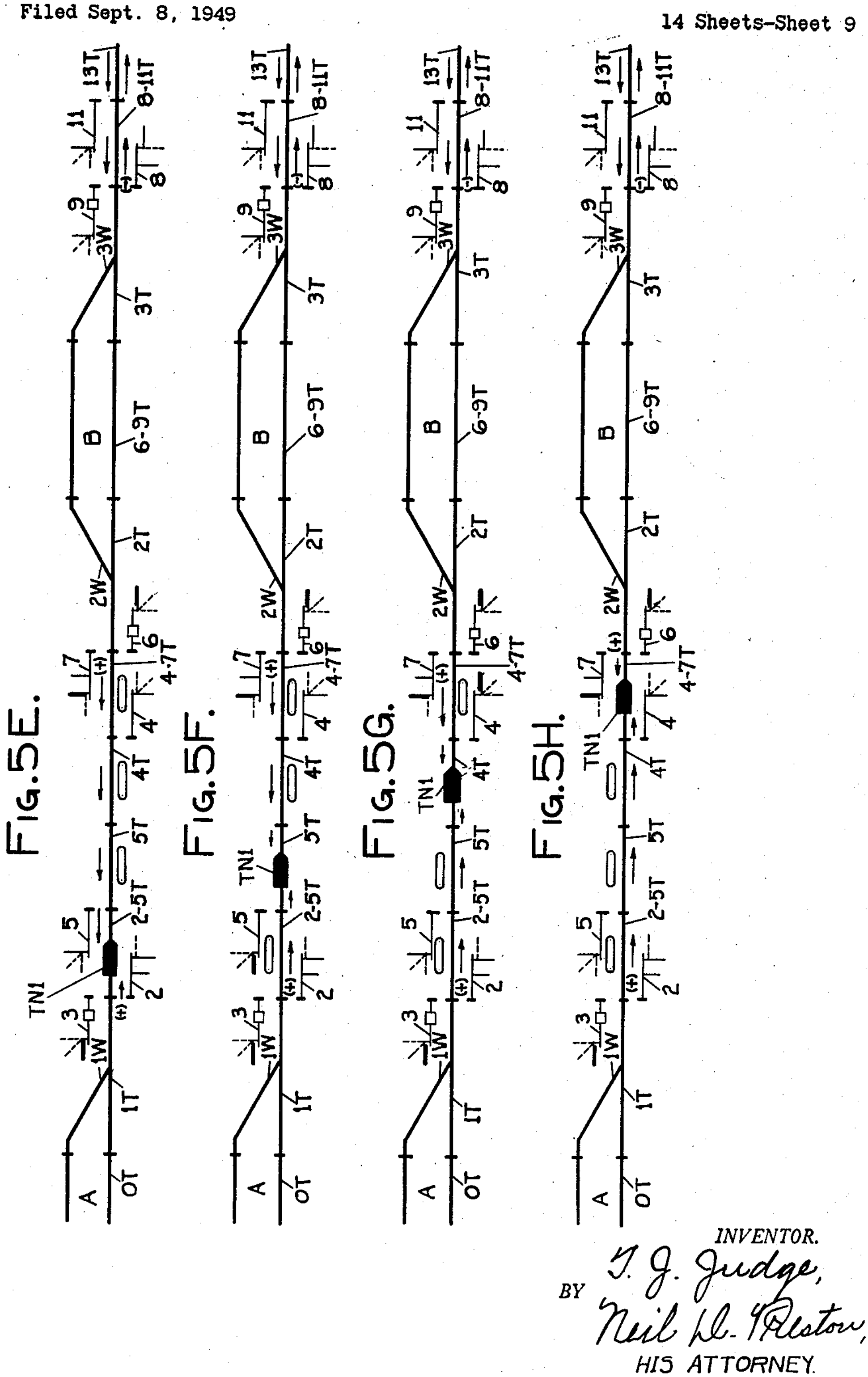

It will be noted from Figs. 5C and 5D that the intermediate signal 4 is not approach lighted when the train enters the signal track stretch. Also the opposing signal 5 is likewise dark under such circumstances. As this east-bound train, however, wholly enters the track section 5T as indicated in Fig. 5F, the code pulses received at the signal 5 over the track section 2–5T are repeated into the track section 5T up to the rear end of the train. The application of these pulses from battery TB5 causes current pulses to flow through series resistors 42 and 22. The approach relay 5AR is connected across the resistor 22, and due to the shunting effect of the train, the current flow in the track rails and through resistor 22 is above the value existing when the train is not present in the track section. This added flow through resistor 22 creates a sufficient potential drop across it to energize the approach relay 5AR during the application of each code pulse. Thus, while the train is present in the track section 5T, the slow acting approach repeating relay 5APR is intermittently energized through front contact 84 of the approach track relay 5AR. For this reason, front contact 70 of relay 5APR energizes lamp L5 of signal 5 and causes this signal to be illuminated throughout the time that the track section 5T is occupied by a train. Upon the entrance of this east bound train into track section 4T, the approach relay 4AR is connected across the track rail during the application of each code pulse, as explained in connection with the approach relay 5AR associated with the signal 5. Thus, while the train is present in this track section 4T each code pulse applied to that section is of a relatively high current value due to the presence of the train shunting the track rails. This causes sufficient current to flow through the approach relay 4AR to cause it to be intermittently operated by the code pulses being applied in advance of the train. This intermittent operation of its front contact 178 causes the slow release relay 4APR to be picked up and maintain its contact 179 closed to energize the lamp L4 of signal 4. At the same time front contact 190 of relay 4APR is closed so that upon each deenergization of track relay 4DTR the relay 4AP is energized by a circuit closed from (+) and including back contact 185 of relay 4TP, back contact 186 of relay 4HTR, back contact 187 of relay 4DTR, front contact 190 of relay 4APR, front contact 191 of relay 4DTP, windings of relay 4AP, to (−). The relay 4AP is sufficiently slow releasing in its characteristics to be maintained picked up by the successive energizations. Thus, the signal 4 has its operating windings SA energized over a circuit closed from (+), and including front contact 192 of relay 4AP, back contact 193 of relay 4HTP, front contact 194 of relay 4DTP, windings SA of signal 4, front contact 195 of relay 4DTP, back contact 196 of relay 4HTP, front contact 197 of relay 4AP, to (−). This energization of the signal causes it to be operated to a proceed or clear indicating position and such an aspect is given by reason of the fact that its lamp L4 is energized. In this way, the intermediate signal 4 is approach controlled and approach lighted, as indicated in Fig. 5 of drawings.

When the east-bound train passes the signal 4, it of course shunts the track section 4–7T so that the track relay 4DTR is no longer actuated by code pulses. For this reason, the relays 4DTP and 4AP are dropped away causing the signal to be controlled to a stop condition i. e. its operating winding SA is deenergized. However, it is desirable when a train passes a signal that such signal not only be operated to a stop position but that such stop aspect should be displayed so that the signal can be observed by the rear end brakeman of the train. While the train is occupying both track sections, there are no code pulses repeated around the insulated joints by the relay 4CPP as there was just before the train entered the section 4–7T. For this reason, the approach relay 4AR remains deenergized and its repeater relay 4APR drops away. Also, the absence of code pulses allows the track repeater relay 4TP to remain dropped away. Thus, there is an energizing circuit for the lamp L4 of signal 4 closed from (+) and through a circuit including back contact 188 of relay 4DTP, back contact 198 of relay 4HTP, back contact 189 of relay 4TP, back contact 179 of relay 4APR, limiting resistor, lamp L4, to (−). As soon as the train wholly enters the track section 4–7T, the track relay 4TR responds to the code pulses following the train and causes its repeater relay 4TP to pick up opening back contact 189 and deenergizing the lamp L4 as indicated in Fig. 5H of the drawings.

Figures 5I, 5J, 5K, 5L:
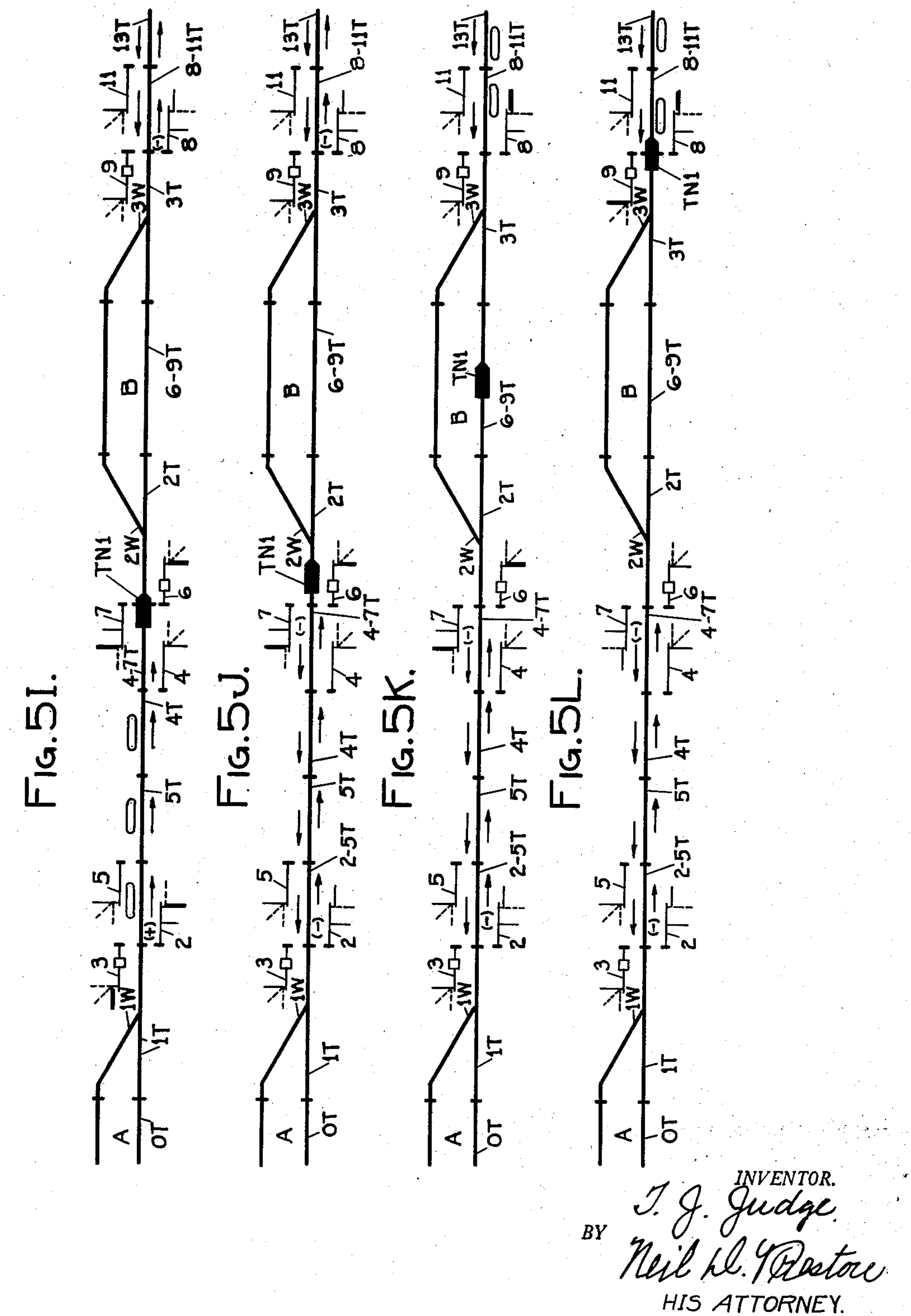

It has already been pointed out that the passage of a west-bound train from the track section 2–5T into the detector section 1T of Fig. 1A causes the picking up of the directional stick relay 3SR. A similar operation takes place as this east-bound train passes from the track section 4–7T into the detector track section 2T, which results in the picking up of the directional stick relay 6SR. This condition of relay 6SR causes front contact 180 to be closed and maintain the local self-coding operation, so that pulses are transmitted to the west over track section 4–7T as soon as the east-bound train leaves that track section. These pulses will be negative in character as indicated in Fig. 5J because the signal 6 is held at stop due to the presence of the east-bound train. Thus, although the presence of the train in detector track section 2T causes the dropping away of the track relay 2ATR so that front contact 92 included in the circuit to the coding relays is opened, the picking up of the directional stick relay 6SR causes its front contact 180 to be closed. Thus, an alternate circuit is provided for the coding relays with the result that the self-coding operation is not interrupted as the east-bound train passes through and beyond the detector track section 2T.

The entrance of the east-bound train into the track section 6–9T causes the deenergization of track relay 6TR which opens its front contact 181 and in turn deenergizes its repeater relay 6TPR of Fig. 1D. This approach lights the signal 8 by the closure of back contact 182 in the same manner as described for the signal 2 of Fig. 1A. This condition has been indicated in the diagram of Fig. 5K. The passage of the east-bound train into the single track stretch to the east of siding B causes the same operation as described in connection with the stretch of track between sidings A and B as indicated in Fig. 5L. However, it should be noted that the restoration of the signals 6 and 7 to unilluminated conditions is effected upon the leaving of the train from the track section 6–9T which allows the track relay 6TR to pick up and relase the directional stick relay 6SR to close back contact 180. This restoration of signals 6 and 7 has been indicated in the diagram 5L.

It should be noted that when the train leaves the track section 4–7T the local self-coding is effecting the application of code pulses to this track section; and the transmission of these pulses from this location cooperate with the pulses being transmitted from the signal 2 so as to establish end-to-end coding operation as previously described and as set forth in detail in connection with the simplified illustration of Fig. 2.

In Figs. 1A and 1C this circuit organization is shown in greater detail than in Fig. 2 and in these former drawings an additional contact has been shown in the circuit for each of the code control relays. For example, in Fig. 1A back contact 161 of relay 3YGP is shown as being included in series with the code control relay 2CC and in Fig. 1C back contact 205 has been shown included in series with the code control relay 7CC.

It was previously described that the relay 3YGP is arranged to have either slow or quick releasing characteristics as provided by the condenser 48 and resistor 49. The yellow-green repeater relay 6YGP is similarly arranged with respect to the resistor 96 and the condenser 97. In connection with the description of the manner in which the directional stick relays are controlled, an explanation was given of the manner in which the relay 3YGP was made to have slow release characteristics. An examination of the circuit associated with this relay 3YGP shows, however, that if the relay 3YGP is deenergized by the picking up of front repeater relay 2TFP, the condenser 48 and resistor 49 will then not be connected in parallel with this relay so that relay 3YGP will then have quick drop away characteristics.

Under certain conditions it is highly desirable that relay 3YGP drop away in a relatively short time following its deenergization. Thus if there is a train occupying the track section 4–7T so that no code pulses can then be received by the track relay 2TR connected across the rails of track section 2–5T, the back contact 101 of front repeater relay 2TFP will be closed and if the track ahead of signal 3 is at that time clear for the required distance, the yellow-green repeater relay 3YGP will be picked up and its back contact 161 open. Assuming now that the east-bound train moves out of track section 4–7T, the reception at the signal 2 location of the first code pulse from the signal 7 location will cause the picking up of the front repeater relay 2TFP. As already pointed out, the relay 3YGP will drop away quickly under these circumstances. Consequently, its back contact 161 will be closed so that when the front contact 160 of relay 2TBP closes at the termination of this first received code pulse, the code control relay 2CC may then be immediately picked up provided that the code repeater relay 2CP is then dropped away. In this manner the coding apparatus at this location is quickly actuated for the end-to-end coding operation previously described. A similar operation involving relay 6YGP takes place, of course, at the signal 7 self-coding location when a westbound train passes out of the track section 2–5T.

*Line wire control of signals at siding*

Referring to Figs. 1C and 1D placed end to end, it will be observed that line wires 175, 176, and 199 extend through siding section for the control of the entering signals 6 and 9. In addition, the line wires 200 and 201 serve to repeat the condition of the track relay 6TR at the west end of the siding to the repeater relay 6TPR at the east end of the siding. The wire 176 serves as a common wire for the signal control while the line wire 155 is more particularly for the control of signal 6 and line wire 175 is for the control of a signal 9.

The line wire 199 includes a back contact 88 of the back contact repeater relay 7TBP so that signal 6 cannot be energized unless this relay is dropped away due to the absence of code. In other words, signal 6 cannot be controlled to a proceed indication unless no code pulses are being received at its location over the track section 4–7T. Front contact 114 of track repeater relay 2TPR is also included in the circuit for signal 6. Likewise, the track relay 6TR has its contact 155 included in this line wire 199, as well as a contact 156 of its repeater relay 6TPR at the other end of the siding section. The repeater relay 3TPR also has a front contact 117 in this line wire 199. Therefore, it will be apparent that when any of the track sections 2T, 6–9T and 3T are occupied, this circuit for the signal 6 will be opened. Also, since the repeater relays 2TPR and 3TPR are controlled by the switch repeater relays 2NWP and 3NWP respectively, the track switches 2W and 3W must be in normal positions in order for this line circuit to be closed.

It will be apparent that the line circuit for the signal 9 is similar to this line circuit just described for signal 6.

The signal 8 is normally controlled to its proceed position so that the line circuit for signal 6 is energized with the normal polarity through front contacts 150 and 151 of relay 8GP. Thus, if a train approaches the signal 6 causing back contact 88 of relay 7TBP to be dropped away, then the signal 6 will be operated to a proceed position. On the other hand, if the signal 8 is at stop, the green repeater relay 8GP is dropped away so that no energy is applied to the line circuit for clearing the signal 6, which would be the case if an east-bound train were leaving the passing siding B. This is because the directional stick relay 8SR is not picked up under such circumstances. However, if an east bound train has passed along the main track and placed the signal 8 at stop, then the directional stick relay 8SR is picked up. This causes the line circuit for signal 6 to be energized with the proper polarity to operate it to a caution position and give a caution indication upon the approach of a train on section 4–7T. More specifically, this is because a circuit is closed from (+), through back contact 153 of relay 9SR, front contact 152 of relay 8SR, back contact 151 of relay 8GP to apply the positive energy (+) to the common line wire 176, while negative energy (−) is applied through back contact 150 to the line wire 199.

*Train movements*

A series of diagrams have been shown in Figs. 5, 6 and 7 to illustrate different conditions of traffic, the codes transmitted and the resulting control of the signals. These diagrams thus provide an illustration of the different overlap controls provided in accordance with the present invention.

*Normal conditions*

As previously described, the system assumes a normal condition where codes are transmitted through the single track stretches by what is termed end-to-end self-coding, yet all signals are not illuminated and certain of the signals are controlled to stop positions while others are controlled to proceed positions. This normal condition of the signals and code operation has been illustrated in the diagram of Fig. 5A. Such an organization provides a considerable saving in energy and also conserves the life of the incandescent lamps employed in the signals. Also, the approach lighting of a signal in addition to supplying the desired indication to an on-coming train, also supplies information as to traffic conditions to workmen along the trackway.

*East bound train movements*

The diagrams of Figs. 5B through 5L illustrate the conditions of the system for an east-bound train movement through the stretch of track selected as embodying the present invention. The entrance of an east-bound train into the siding section 0T effects the approach lighting of the signal 2 and also the tumble down of the coding operation to cause signal 7 to be controlled to stop and to be illuminated (see Fig. 5B). This tumble down also illuminates the entering signal 6. It can be noted that there is no tumble down effect on the signals each of the siding B insofar as their illumination is concerned, and no control conditions are established; but, if an opposing train movement were to take place there are certain conditions set up for giving a double distant approach control, as will be discussed later.

No change in the control of the signals takes place as the train enters the detector track section 1T as illustrated in Fig. 5C; but as the train enters the single track stretch, its presence in track section 2–5T causes the signal 3 to also be illuminated. As the train proceeds entirely into the track section 2–5T, a code is caused to follow it due to the local self-coding operation, and these code pulses in this section are positive (+) as indicated in this Fig. 5E. The passage of the train into the track section 5T causes the signal 5 to be illuminated as indicated in Fig. 5F, but this illumination continues only so long as the train is in that section. This condition is illustrated in Fig. 5G where the signal 5 is shown to be unilluminated with the train in section 4T.

As the train passes from section to section, the code builds up in the successive sections in the rear of the train as indicated in these figures, and the polarity of the code remains positive in the first track section 2–5T. The entrance train into the track section 4T causes the signal 4 to be illuminated as shown in Fig. 5G. As the train proceeds past the signal 4, the signal remains illuminated until the train is entirely in the track section 4–7T when it is then extinguished as illustrated in Fig. 5H.

The entrance of the train into the track section 2T as illustrated in Fig. 5I, does not effect the signal indications while no other trains are around. But as soon as the train wholly enters the track section 2T, or at least the rear end of the train has passed beyond the signal 6, the code then builds up in the single track stretch to the rear as illustrated in Fig. 5J. This condition causes the signals 2 and 3 to become unilluminated, and the code in track section 2–5T changes to a negative (−). The signals in the next single track stretch to the east are caused to be illuminated in the same manner as previously described for the single track stretch between siding A and B as soon as the train enters the track section 6–9T. This condition has been illustrated in Fig. 5K. When the train leaves such track sections 6–9T, the signals 6 and 7 then become unilluminated as indicated in Fig. 5L. This Fig. 5L also shows that the signal 9 becomes illuminated when the train enters the track section 8–11T the same as it would when the train entered the track section 2–5T in passing the signal 2. In this way, the train continues its passage throughout the territory signalled in accordance with the present invention.

Since the system is symmetrical for both directions of traffic, no diagrams or specific description has been directed to the operation in connection with a west bound train movement. It is believed that such operation may be readily understood by analogy to that given in connection with the passage of the east bound train.

*Following train movements*

Figures 6A, 6B, 6C, 6D:
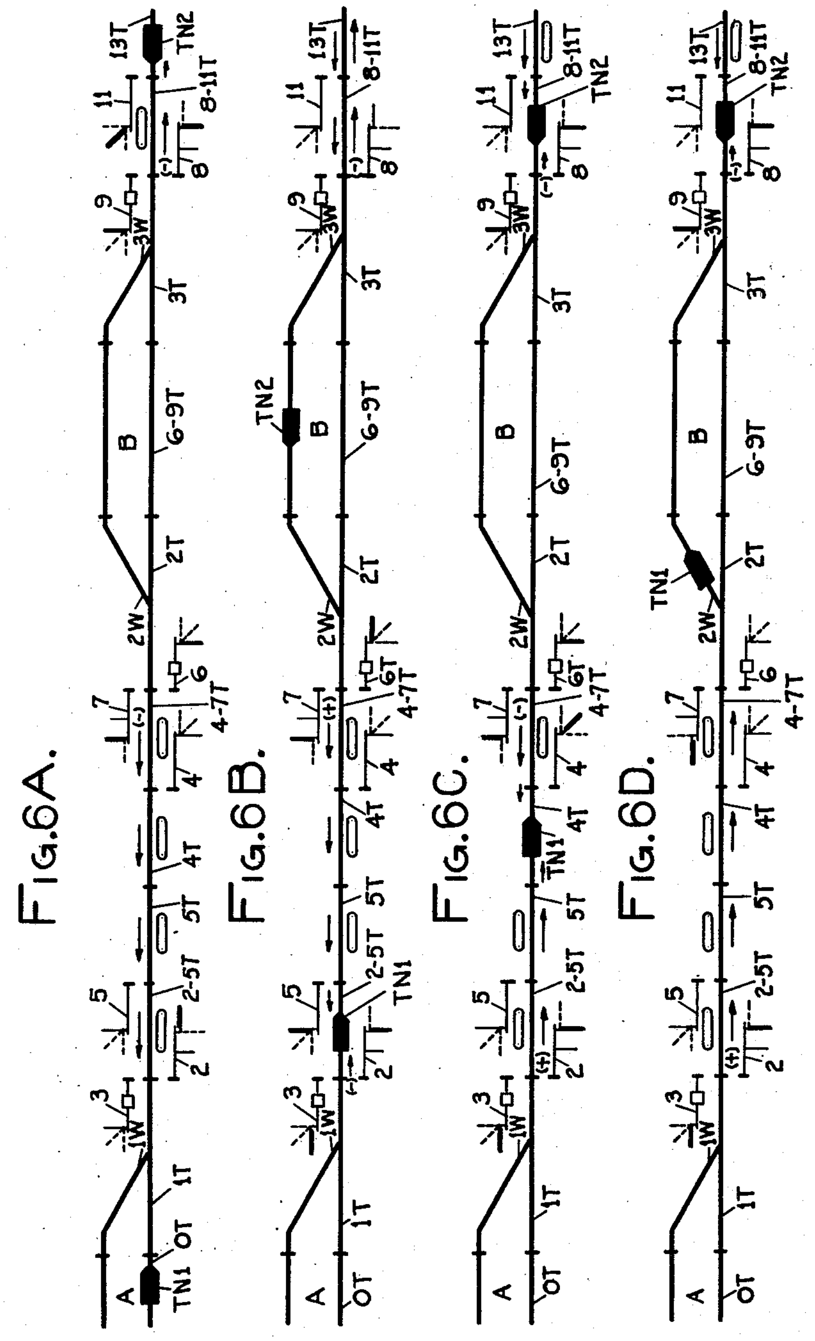

While a train is passing through a single track stretch, it holds the leaving signal next in the rear at stop, as indicated in Fig. 7A. Since each leaving signal is an absolute signal, i. e. a train is not permitted to pass such a signal at stop, a following train must remain at the headblock signal until the preceding train has moved out of the single track stretch. This has been indicated in the diagram of Fig. 7B.

When a train passes a headblock signal location, it causes the picking up of a directional stick relay so that code pulses are applied to the single track stretch to the rear in spite of the track circuit control included in the code transmitting circuits which is effective when the train is going in the opposite direction to remove coding in advance of it to effect a tumble down operation. The operation of this directional stick relay, such as directional stick relay 6SR, causes the code to be transmitted to permit the following train to receive a proceed aspect from the leaving signal 2, as illustrated in Fig. 7B. In other words, the presence of the train in the track sections 2T and 6–9T would prevent the following train from passing the signal 2 and coming up to the signal 4 at caution and the signal 6 at stop if it were not for the directional relay 6SR and its front contact 180 which shunts out the track circuit control including contacts 92 and 110 of track relays 2ATR and 6TR. Since the train in this track section is holding the signal 6 at stop, it will be apparent that the polarity of the code transmitted over the track section 4–7T will be such as to cause signal 4 to be controlled to a caution position, so that a caution signal aspect may be displayed by the signal 4 upon the approach of the following train into the track section 4T, as indicated in Fig. 7C. It will be noted that the passage of the first train into the track section 6–9T continues to hold the signal 6 at stop and the directional stick relay 6SR is still picked up so that a caution code is transmitted to the signal 4 and the following train can proceed on a caution signal aspect (see Fig. 7D).

The passage of the first train from the track section 6–9T into the track section 3T as indicated in Fig. 7E does not in any way change the indication of the signal 4 although the control conditions have been somewhat shifted. More specifically, the train in the track section 3T holds the signal 6 at stop by reason of open front contact 117 of the track repeater relay 3TPR; but, since the train has passed out of the track section 6–9T, all of the stick circuits for the stick relay 6SR have been opened and it releases. However, front contact 92 and 110 of track relays 2ATR and 6TR respectively are now closed, so that the opening of front contact 180 of relay 6SR does not stop the transmission of the caution code to the signal 4.

However, when the first train proceeds into track section 8–11T and past the signal 8, this signal is held at stop because such train shunts the track section 8–11T removing code pulses from the associated decoding relays. Assuming that this first train is entirely past the signal 8 and the directional stick relay 8SR has been picked up, the proper polarity is caused to be placed upon the line wire 199 to cause the signal 6 to indicate caution. It is of course understood that the signals 4 and 6 are illuminated because of the presence of the train in the track section 4T. Obviously, the signal 6 continues to be illuminated as the train passes into the track section 4–7T. It should be noted here, that the entering signals are provided with overlap markers, and each of these signals is to be considered substantially the same as an absolute signal i. e. a train must stop when the entering signal indicates stop and then proceed only if the train has orders to take the sliding at that signal location for a train meet. At other times, the entering signal must be considered the same as an absolute signal i. e. the train must not pass such signal while it is indicating stop. Thus, it can be seen that as the following train approaches the signal 6 before the preceding train has entirely passed the signal 8, the signal 6 will be held at stop, and the following train will have to wait until the signal 6 is cleared for it to proceed.

In brief, a following train movement into any particular single stretch is permitted only when the first train passes from that single track stretch to the next single track stretch. In making this statement, it is assumed that the stretch of track between signals 2 and 6 represents one stretch of single track; and the stretch of track between signals 6 and 8 represents a second stretch of single track. It is for this reason, that this signalling system may be considered one that provides following train movements from station-to-station, or headblock signal location to headblock signal location, in such a way that any one stretch of single track may have only one train properly traveling therein.

The leaving signals, such as 2 and 7 have been indicated as being absolute signals by the marker arms, while the entering signals such as 3 and 6 have been indicated as overlap signals by suitable markers represented as small square in the drawings.

It is to be understood that the control of traffic is effected in the same way for west bound train movements and this has been indicated in the drawings by the representation of the following train movements in the diagram of Fig. 7G.

*Opposing train movements*

The signalling system of the present invention provides that opposing train movements may be made in such a way as to facilitate meets at the sidings and yet give the appropriate protection against unsafe traffic movements. It is of course understood that the signalling system of the present invention provides signal indications for the purpose of protecting train movements, but that the actual train movements are made in accordance with instructions issued by a central dispatcher.

For example, trains TN1 and TN2 may have instructions to meet and pass each other at the siding B with train TN2 taking the siding due to its status as an inferior train in comparison to the train TN1. When the east bound train TN1 occupies the track section 0T, it causes the tumble down action of the code to hold the signal 7 at stop. This condition in turn is effective to control the signal 9 to stop and in turn cause the signal 11 to be controlled to a caution position (see Fig. 6A). This caution control of signal 11 is effected by transmitting pulses of negative polarity. The approach of the train TN2 shunts the track section 13T causing the signal 11 to be illuminated. This shunting of track section 13T also prevents the reception of code at the signal 8 which effects the approach lighting of the signal 9 at stop.

Since the train TN2 is closer to the siding B than the train TN1, it presumably reaches the signal 9 somewhat ahead of time and finds it at stop. As above mentioned, the entering signal 9 has an overlap marker upon it which in effect makes this signal an absolute signal for main line train movements and a permissive signal when a train has instructions to take the siding. It has been assumed that the train TN2, either because of its orders or because of its rating with respect to TN1 is to take the siding. Thus, the train TN2 stops at signal 9 and sends the brakeman ahead to throw switch 3W, so that the train TN2 may take the siding as shown in Fig. 6B. This can be done because the overlap control for the signal 4 extends only to the insulated joints at the west end of the detector track section 3T. In this connection, it should be noted that the overlap marker might well be located at these insulating joints at the west end of the detector track section 3T, but the total result and effect would be the same as with the marker located on the signal 9, since in both cases the signal 9 must be given the same significance with respect to the governing of train movements.

As will be seen in Fig. 6B, the train TN2 located on the passing siding allows the signals to clear for the train TN1 in such a way that it may travel at speed along the main track.

On the other hand, we may assume that the train TN2 is the superior train and must therefore follow the main track rather than taking the siding. In this case, the train TN2 when it comes to the stop signal 9 must wait in the track section 8–11T until the signal 9 gives a clear aspect indicating that the train may proceed. The train TN1 in this case approaches the signal 4 causing it to be illuminated, so that it displays its caution aspect as indicated in the diagram of Fig. 6C. The train TN1 may proceed up to the signal 6 which it will find at stop; but, because its orders (either written or because of its relative superiority) require that it take siding, it sends the brakeman ahead to throw the switch 2W so that it may pass into the siding B. This condition has been indicated in the diagram of Fig. 6D. In this connection it should be observed that although the train passes onto the siding, the signal 9 is held at stop until the switch 2W is restored to its normal position because of the control of the normal switch position relay 2NWP and its effect upon the signal circuits as previously described more particularly in connection with the relay 1NWP at the siding A. In other words, the signal 9 is not cleared to allow the train TN2 to move until it is entirely safe for that train to do so, i. e. when the train TN1 is wholly in the clear on the siding B, as indicated in the diagram of Fig. 6E.

In this way, the signalling system of the present invention provides for opposing train movements in a manner to give adequate protection, and yet at the same time facilitate meets regardless of whether the superior train or the inferior train first arrives at the passing point. Although the usual traffic movements have been typically illustrated in the diagrams and described with respect to the apparatus of Figs. 1A, 1B, 1C, and 1D, it is to be understood that these are only typical illustrations and that the present invention intends to include within its scope all of the different traffic movements to which the apparatus may be adapted although not specifically described herein.

*Double intermediate signals*

When the stretch of track intervening between headblocks is of a proper length so that the approach signals may be located at the same point, a double-intermediate signal circuit organization may be employed such as shown in Fig. 8 where the intermediate signals 15 and 16 are adjacent each other as shown.

Some means must, of course, be employed to enable code pulses to be repeated around the insulating joints at such an intermediate-signal location. Consequently, if positive pulses are received from the left of the intermediate-signal location, the arrows associated with polar track relays 16HTR and 16DTR indicate that polar relay 16DTR will be picked up. When this happens the closing of its front contact 115 establishes a circuit to energize code repeater relay 16CP from (+), back contact 216 of track relay 15DTR, back contact 147 of track relay 15HTR, back contact 148 of track relay 16HTR, front contact 115 of track relay 16DTR, the windings of code repeater relay 16CP to (−). If negative pulses are received from the left, a polar track relay 16HTR will be picked up and a circuit will then be established from (+), back contact 216 of track relay 15DTR, back contact 147 of track relay 15HTR, front contact 148 of track relay 16HTR, the windings of code repeater relay 16CP to (−). Thus, the reception of either positive or negative pulses is effective in causing code repeater relay 16CP to be intermittently energized. As a result, front contact 149 of code repeater relay 16CP is alternately closed and opened so as to place track battery TB15 across the rails of track section 15T.

Obviously, the similarity of the circuit organization at this intermediate-signal location results in the repeating of received code pulses from the right in a similar manner.

As is the case with the single intermediate signals 4 and 5 of Fig. 1B, the double-intermediate signals are provided with approach relays such as approach relays 15AR and 16AR. Approach relay 15AR, for example, is energized only when a train is occupying track section 15T and when code pulses are being received from the left so as to intermittently close front contact 149 of code repeater relay 16CP. If approach relay 15AP is intermittently picked up under these circumstances, approach repeater relay APR will also be intermittently energized by the closing of front contact 120 of approach relay 15AR. Although approach repeater relay APR is thus intermittently energized it will remain picked up because of its slow release characteristics as shown by the heavy base line of the symbol representing that relay. Similarly, approach repeater relay APR may be picked up by the intermittent picking up of approach relay 16AR. This approach relay 16AR is, obviously, also only energized by there being a train in track section 16T and by there being pulses received from the right so as to close front contact 121 of code repeater relay 15CP. When approach repeater relay APR is energized, circuits are provided to illuminate lamps L15 and L16 of signals 15 and 16, respectively, these circuits including front contacts 122 and 123 of approach repeater relay APR. The manner in which the signals at a double-intermediate signal location are controlled will now be examined.

The various resistors and condensers used in connection with the track relays and track batteries all serve purposes similar to that described for the corresponding elements employed at the signal 2 self-coding location.

With a train occupying track section 15T so as to shunt track relays 15DTR and 15HTR, and with positive pulses being received from the left, track relay 16DTR is intermittently energized and approach repeater relay APR is picked up. Each time that a code pulse causes track relay 16DTR to be picked up, the closing of its front contact 124 establishes a circuit to energize track repeater relay 16DP from (+), including back contact 125 of track relay 16HTR, front contact 124 of track relay 16DTR, the windings of relay 16DP, to (−). At the end of every such positive code pulse the closing of back contact 124 of track relay 16DTR provides a circuit from (+) including back contact 125 of track relay 16HTR, back contact 124 of track relay 16DTR, front contact 126 of approach relay APR, front contact 146 of track repeater relay 16DP, the windings of approach repeater relay 16AP, to (−). Since the train occupying track section 15T causes track relays 15DTR and 15HTR and their associated repeater relays to be dropped away, a circuit is thus established from (+), back contact 127 of approach repeater relay 15AP, back contact 128 of track repeater relay 15DP, back contact 129 of track repeater relay 15HP, back contact 130 of approach repeater relay 15AP, front contact 131 of approach repeater relay 16AP, back contact 132 of track repeater relay 16HP, front contact 133 of track repeater relay 16DP, the operating windings of signal 15, front contact 134 of track repeater relay 16DP, back contact 135 of track repeater relay 16HP, front contact 136 of approach repeater relay 16AP, back contact 137 of approach repeater relay 15AP, back contact 138 of track repeater relay 15HP, and back contact 139 of track repeater relay 15DP to (−). Thus, signal 15 is provided with a voltage of such a polarity that it will display a green aspect.

Now, assuming that the train is still occupying track section 15T but that negative code pulses are received from the left, track relay 16HTR will be intermittently picked up. Thus, whenever its front contact closes, track repeater relay 16HP will be intermittently energized and whenever its back contact 125 closes, approach repeater relay 16AP will be energized by means of a circuit from (+), back contact 125 of track relay 16HTR, back contact 124 of track relay 16DTR, front contact 126 of approach repeater relay APR, front contact 140 of track repeater relay 16HP, the windings of approach repeater relay 16AP, to (−). When this occurs, a circuit is provided from (+), back contact 127 of approach repeater relay 15AP, back contact 128 of track repeater relay 15DP, back contact 129 of track repeater relay 15HP, back contact 130 of approach repeater relay 15AP, front contact 131 of approach repeater relay 16AP, front contact 132 of track repeater relay 16HP, the windings of signal 15, front contact 135 of track repeater relay 16HP, front contact 136 of approach repeater relay 16AP, back contact 137 of approach repeater relay 15AP, back contact 138 of track repeater relay 15HP, back contact 139 of track repeater relay 15DP, to (−).

If no pulses are received from either direction, approach repeater relays 16AP and 15AP will both be deenergized and neither signals 15 nor 16 can then be energized. Both of these signals will therefore display a red aspect. Also, since the track repeater relays 16DP, 16HP, 15HP and 15DP will be dropped away a circuit will be established to illuminate both lamp L15 and L16, this circuit being from (+), back contact 141 of track repeater relay 16DP, back contact 142 of track repeater relay 16HP, back contact 143 of track repeater relay 15HP, back contact 144 of track repeater relay 15DP, and from this point through both back contacts 122 and 123 to the lamps L15 and L16, respectively.

It should be understood that when the double intermediate signal location is employed as a part of the embodiment of the present invention in place of the approach signals shown in Fig. 1B, the operation of the system in general is the same as above described. The control of the signals results in governing the traffic in exactly the same way as previously described in connection with the single intermediates and shown in typical traffic diagrams. For these reasons, it is considered to be unnecessary to consider in detail the operation of this Fig. 8 under the various typical traffic conditions.

*Summary*

From the above description, it will be apparent that the present invention provides a system in which code pulses are transmitted in what may conveniently be termed a self-coding operation that can be carried on between the two ends of a single track stretch even though there are intermediate points at which the code pulses must be repeated. The organization is so arranged that this self-coding operation may be instituted with a minimum of elapsed time in the resolution of any code fight that may occur. Primarily these advantageous results are obtained in the manner of providing local coding operation when end-to-end self-coding is not in progress, which local self-coding is effected by apparatus that is adapted to be quickly synchronized upon the reception of codes from the opposite end of the single track stretch.

Another characteristic advantage of the present invention resides in the manner in which signals are controlled by directional stick relays at head-block signal locations to obviate the effect of the overlap controls when opposing train movements are made in accordance with the principles of signalling employed herein.

Having thus described a signalling system for single track railroads as one specific embodiment of the present invention, it is desired to be understood that this form is selected to facilitate in the disclosure of the invention rather than to limit the number of formations which it may assume; and, it is to be further understood that various modifications, adaptations and alterations may be applied to the specific form shown to meet the requirements of practice, without in any manner departing from the spirit or scope of the present invention.

What I claim is:

1. In a coded track circuit signalling system for a stretch of single track, code transmitting and code receiving means located at each end of said stretch, said code transmitting means at each end operating locally to apply code pulses at spaced intervals to said track when said stretch is occupied by a train, a self-coding relay associated with each code transmitting means and acting on said code transmitting means during said local coding operation for determining the length of said intervals between said pulses, and circuit means governed by said code receiving means for causing said self-coding relay to have slow release characteristics during said local coding operation but to cause said self-coding relay at either end to have relatively fast releasing characteristics when said code receiving means at said end is acted upon by a code pulse received from the other end of said stretch when said stretch becomes unoccupied, whereby said code transmitting means at the opposite ends of said stretch are caused to transmit code pulses alternately.

2. In a coded track circuit signalling system for a stretch of track, code transmitting and code receiving means located at each end of said stretch, said code transmitting means at each end being normally operated to apply code pulses to said stretch in response to the operation of its associated code receiving means by similar code pulses received from the other end of said stretch to thereby produce end-to-end self-coding, said code transmitting means also being effective when said stretch is occupied by a train to apply code pulses to said stretch independently when no code pulses are being received from the other end to thereby produce local self-coding, said code transmitting means including a self-coding relay having slow release characteristics to determine the frequency of said pulses applied to said stretch during said local self-coding operation, said self-coding relays at both ends of said stretch having their release characteristics so adjusted with respect to each other that the pulse frequency during local self-coding is different at each end of said stretch, and circuit means at each end of said stretch controlled by said code receiving means at that end for changing the slow releasing characteristics of said self-coding relay upon the reception of a code pulse, whereby upon conditions being established for a resumption of said end-to-end self-coding a code fight is quickly resolved.

3. In a coded track circuit signalling system for a stretch of track, code transmitting and code receiving means at each end of said stretch, a track battery associated with said code transmitting means at each end of said stretch, said code transmitting means at each end being effective when said stretch is occupied to independently apply code pulses to said stretch to thereby produce local self-coding, said code transmitting means at each end including a self-coding relay having slow release characteristics and intermittently operated to determine that the pulse frequency is relatively slow and that the "off" periods between said code pulses are relatively long with respect to the "on" periods, whereby the frequency of operation of said code transmitting means is at a minimum and whereby said track battery is applied to said stretch of track only a small amount of the time during occupancy of said stretch by a train, and circuit means at each end of said stretch controlled by the associated code receiving means to stop the operation of said self-coding relay when code pulses are received from the opposite end of the stretch.

4. In a coded track circuit type signalling system for a stretch of track; code transmitting means at each end of said stretch comprising, a track battery, a code repeating relay, a code transmitting relay, and a self-coding relay, each of said relays having front and back contacts; circuit means for energizing said code repeater relay through a back contact of said self-coding relay; circuit means for energizing said self-coding relay through a front contact of said code repeater relay; circuit means for energizing said code transmitting relay through a front contact of said self-coding relay and a front contact of said code repeating relay; said code repeating relay and said self-coding relay having slow release characteristics such that the intermittent deenergization of said code repeating relay by the picking up of said self-coding relay delays the dropping away of said code repeating relay until a circuit has been established for a sufficient time to energize said code transmitting relay; and circuit means governed by the operation of said code transmitting relay for connecting said track battery across the rails of said stretch of track each time said code transmitting relay is energized, whereby a local coding operation is caused to take place at both ends of said stretch by the interaction of these relays during their intermittent operation.

5. In a coded track circuit signalling system for a stretch of track divided into a plurality of track sections, a code transmitting relay at each end of said stretch tending to assume an inactive condition but capable when rendered active to transmit a code pulse toward the opposite end of said stretch, a code receiving track relay at each end of said stretch capable of receiving code pulses over the rails of said stretch while its associated code transmitting relay is inactive, a slow acting repeater relay for each said track relay, circuit means at each end of said stretch including contacts of said track relay and its slow acting repeater relay for rendering said code transmitting relay active for a limited time to transmit a return code pulse at the termination of each received code pulse, circuit means located at adjoining ends of each pair of track sections in said stretch and including track relays and sources of energy, said circuit means being effective to repeat a code pulse received over the rails of either section onto the rails of the other adjoining section, whereby code pulses are transmitted through the sections of said stretch in opposite directions alternately by a self-coding operation which waits for the repeat of a code pulse through each section of the stretch before initiating a code pulse for the opposite direction.

6. In a coded track circuit signalling system for a stretch of track, code transmitting and code receiving means located at each end of said stretch, local code pulse producing relay means at each end of said stretch operable at a relatively slow rate whenever the associated code receiving means fails to receive code pulses, reply pulse producing circuit means at each end of said stretch operable when rendered effective to cause the associated code transmitting means to transmit a reply pulse each time said code receiving means receives a code pulse over the track rails, circuit means operated by said code receiving means upon the reception of a code pulse to change the rate of operation of said local code pulse producing relay means to a relatively faster rate, and a code control relay at each end of said stretch normally tending to render the associated local code pulse producing relay means active but operated by said code receiving means when code pulses have been received for a limited time to render said reply pulse producing circuit means effective and said local code pulse producing relay means inactive, whereby code pulses are transmitted independently from both ends of said stretch while a train is present in the stretch but whereby the departure of a train from said stretch quickly causes an end-to-end self-coding operation to be established.

7. In a coded track circuit signalling system for a stretch of track, a code transmitting relay and a code receiving relay associated with the track rails at each end of said stretch, said track relay being normally connected across said rails and said transmitting relay being effective to disconnect said track relay and connect a source of energy across the track rails, two timing relays at each end of said stretch, circuit means at each end of said stretch causing the associated timing relays to be alternately energized and deenergized and effective during such operation to intermittently energize the associated transmitting relay to apply code pulses to the track rails, said circuit means being immediately rendered ineffective upon the reception of a code pulse by the associated code receiving relay, and circuit means controlled by said code receiving relay each time it is energized by a received code pulse to cause said code transmitting relay to be momentarily energized immediately following the termination of such received code pulse to transmit a reply code pulse.

8. In a coded track circuit signalling system for a stretch of track, code transmitting and code receiving means located at each end of said stretch, said code transmitting means at each end operating to apply code pulses to said stretch when its associated code receiving means is operated in response to code pulses received from the other end to thereby provide a self-coding operation, timing relay means at each end of said stretch, said timing relay means being connected to be alternately energized and deenergized only while the associated code receiving means fails to receive code pulses and at the same time acting on the associated code transmitting means to transmit code pulses toward the other end, and circuit means at each end of said stretch controlled by said code receiving means at that end when code pulses are received to render said timing relay means at that end inactive.

9. In a coded track circuit signalling system, a stretch of track, head block signals at each end of said stretch for governing traffic in opposite directions through the stretch, leaving signals at each end of the stretch for governing traffic out of the stretch, an intermediate signal located in approach to each of said leaving signals, code transmitting and code receiving means at each end of the stretch, each said transmitting means operating at times to apply a code pulse to the track rails at its end in response to the actuation of its code receiving means by the reception of a similar code pulse from the opposite end of said stretch, each said code transmitting means also operating at other times to apply code pulses to its end independently of the reception of code pulses from the opposite end of said stretch, insulated joints in the track rails of said stretch at each of said intermediate signal locations, code repeating means including track relays at each of said intermediate signals for repeating said code pulses around the insulated joints at such intermediate signal in either direction, said code receiving means also being effective to control the associate intermediate signal to clear or stop in accordance with the character of the codes in advance of that intermediate signal, an approach relay at each intermediate signal location responsive to the code pulses in approach to said intermediate signal when a train is approaching such intermediate signal, circuit means governed by said approach relay for illuminating said intermediate signal to display an aspect in accordance with its then existing control by its associated code receiving means, an additional circuit means for causing said signal to become illuminated in the absence of code pulses on both sides of said intermediate signal, circuit means at each end of said stretch controlled by the code receiving means for that end to clear the associated head block signal only when code pulses are received from the opposite end of the stretch, whereby the presence of a train in said stretch of track causes both said head block signals to be controlled to indicate stop but whereby said intermediate signal is approach lighted when a train is approaching it and also when there are no code pulses received from either direction at the intermediate signal location.

10. In a coded track circuit signalling system, a stretch of track divided into a plurality of track sections by insulated joints, a head block signal at each end of said stretch for governing traffic in opposite directions through the stretch, leaving signals at each end of the stretch for governing traffic out of the stretch and capable of indicating clear or stop in accordance with traffic conditions in advance, an intermediate signal in approach to each of said leaving signals and located where two track sections adjoin, code transmitting and code receiving means at each end of the stretch, each said transmitting means operating at times to apply a code pulse to the track rails at its end in response to the actuation of its code receiving means by the reception of a similar code pulse from the opposite end of said stretch, each said code transmitting means also operating at other times to apply code pulses to its end independently of the reception of code pulses from the opposite end of the stretch, code repeating means including track relays and sources of energy at each of said insulated joints for repeating said code pulses in either direction around the insulated joints at that location, circuit means for each of said leaving signals controlled in accordance with its indication for determining whether the code pulses transmitted by the associated code transmitting means is of one polarity or the other, circuit means at each intermediate signal distinctively responsive to the polarity of the code pulses received at that location from the leaving signal for controlling such intermediate signal to clear or caution, said code repeating means at each intermediate signal location acting in response to the reception of code pulses of either polarity to repeat code pulses of the same polarity, circuit means at each head block signal responsive to the reception of code pulses by its associated code receiving means for causing that head block signal to indicate clear, and circuit means responsive to the presence of a train in approach to a head block signal for rendering its associated code transmitting means inactive.

11. In a coded track circuit signalling system for a stretch of single track, code transmitting and receiving means at each end of said stretch comprising a track battery, a track relay, a code repeating relay, a code transmitting relay, a local self-coding relay, circuit means connecting said track relay across the rails of said stretch through a back contact of said code transmitting relay and connecting said track battery across the rails of said stretch through a front contact of said code transmitting relay, circuit means including a front contact of said track relay for causing said code repeating relay to be energized when said track relay is picked up, decoding means controlled by said track relay to be rendered active when said track relay is intermittently picked up and released by the reception of successive code pulses, circuit means effective only when said decoding means is inactive for causing said local self-coding relay and said code repeating relay to control each other to be alternately and successively picked up and released, circuit means rendered effective during each releasing period of said code repeatitng relay for momentarily energizing said code transmitting relay, and additional circuit elements for rendering said local self-coding relay slow releasing, said additional circuit elements being effective only while said decoding means is inactive and said track relay is released, whereby said code transmitting means at each end of said stretch is active locally to apply code pulses of a relatively slow rate to the track rails while said stretch is occupied, but whereby each code transmitting means is effective to transmit a code pulse only in response to the reception of a code pulse from the opposite end of the stretch while said stretch is unoccupied and said decoding means at each end is active.

12. In a coded track circuit type of signalling system for a railroad having a stretch of single track on each end of a passing siding and a section of track adjacent said passing siding connecting such two stretches of single track, a head block signal at each end of each single track stretch for governing traffic into the stretch in opposite directions, an entering signal at the entrance to said section of track adjacent said passing siding at each end for governing traffic into said section in opposite directions, code transmitting and receiving means at each end of each of said stretches of single track, each said code transmitting means operating at times to apply a code pulse to said stretch of track at its end in response to the actuation of its associated code receiving means by a similar code pulse received from the other end of said stretch, each said coding transmitting means also operating at other times to also apply code pulses to its end of said stretch independently of the reception of code pulses from the opposite end of that stretch, circuit means governed by said code receiving means at each end of each stretch for controlling the associated head block signal to indicate clear only when code pulses are being received at that end of the stretch from the opposite end, line wires extending between the ends of said passing siding section, circuit means governed by the stop or clear condition of the head block signal at each end of said passing siding to correspondingly control the entering signal next in the rear over said line wires to clear or stop, whereby the entrance of a train into a single track toward said passing siding causes the opposing head block signal to indicate stop by reason of the cessation of the reception of code by its code receiving means and also causes the opposing entering signal next in the rear of said head block signal to indicate stop by reason of the control over said line wires.

13. In a coded track circuit signalling system for a stretch of single track divided into a plurality of track sections, a code transmitting relay at each end of said stretch tending to assume an inactive condition but capable when rendered active to transmit a code pulse toward the opposite end of said stretch, a code receiving track relay at each end of said stretch capable of receiving code pulses over the rails of said stretch while its associated code transmitting relay is inactive, a slow acting repeater relay for each track relay, pulse repeating circuit means at each end of said stretch including contacts of said track relay and said slow acting repeater relay for rendering said code transmitting relay active for a limited time to transmit a return code pulse at the end of each received code pulse, circuit means located at adjoining ends of each pair of track sections in said stretch and including track relays and a source of energy for repeating a code pulse received over the track rails of either section onto the rails of the other section, and local coding circuit means at each end of said stretch rendered effective when said code receiving track relay at that end fails to receive a succession of code pulses for causing said code transmitting relay at that end to be intermittently operated to transmit code pulses, whereby code pulses are transmitted from both ends of said stretch while it is occupied by a train as determined by said local coding circuit means at each end, but whereby code pulses are transmitted in opposite directions alternately by reason of the operation of said pulse repeating circuit means which is rendered effective at each end only upon the reception of a code pulse from the opposite end.

14. In a coded track circuit signalling system for a stretch of single track divided into a plurality of track sections, a head block signal at each end of said stretch for governing traffic into the stretch at that end, a code transmitting relay at each end of said stretch tending to assume an inactive condition but capable when rendered active to transmit a code pulse toward the opposite end of said stretch, a code receiving track relay at each end of said stretch capable of receiving code pulses over the rails of said stretch while its associated code transmitting relay is inactive, a slow acting repeater relay for each track relay, circuit means at each end of said stretch including contacts of said track relay and said slow acting repeater relay for rendering said code transmitting relay active for a limited time to transmit a return code pulse at the end of each received code pulse, circuit means located at adjoining ends of each pair of track sections in said stretch and including track relays and a source of energy for repeating a code pulse received over the track rails of either section onto the rails of the other section, decoding means at each end of said stretch rendered active in response to the repeated operation of the associated code receiving track relay for clearing said head block signal at that end, said decoding means being restored to an inactive condition when that code receiving track relay fails to receive code pulses from the opposite end of said stretch, local coding circuit means at each end of said stretch rendered active when said decoding means is restored to an inactive condition for causing said code transmitting relay at that end to be intermittently operated to transmit code pulses.

15. In a coded track circuit signalling system for a stretch of single track divided into a plurality of track sections, a head block signal at each end of said stretch for governing traffic into the stretch at that end, intermediate signals located at points where certain of said track sections join, a code transmitting relay at each end of said stretch tending to assume an inactive condition but capable when rendered active to transmit a code pulse toward the opposite end of said stretch, a code receiving track relay at each end of said stretch capable of receiving code pulses over the rails of said stretch while its associated code transmitting relay is inactive, circuit means at each end of said stretch including contacts of said track relay and a slow acting repeater relay for rendering said code transmitting relay active for a limited time to transmit a return code pulse at the end of each received code pulse, circuit means located at adjoining ends of each pair of track sections in said stretch and including track relays and a source of energy for repeating a code pulse received over the track rails of either section onto the rails of the other section, decoding means at each end of said stretch rendered active in response to the repeated operation of the associated code receiving track relay for clearing said head block signal at that end, said decoding means being restored to an inactive condition when that code receiving track relay fails to receive code pulses from the opposite end of said stretch, local coding circuit means at each end of said stretch rendered active when said decoding means is restored to an inactive condition for causing said code transmitting relay at that end to be intermittently operated to transmit code pulses, traffic control means at each end of said stretch for selecting the polarity of the code pulses transmitted from that end in accordance with traffic conditions adjacent to that end of said stretch, and decoding means at each intermediate signal responsive both to the code pulses and their polarity as received at that location for controlling the clear, caution and stop indications of such intermediate signal.

16. In a coded track circuit type of signalling system for a railroad having a stretch of single track extending away from each end of a passing siding and a section of track adjacent said passing siding connecting such two stretches of single track, a head block signal at each end of each single track stretch for governing traffic into that stretch in opposite directions, an entering signal at the entrance to said section of track adjacent said passing siding at each end for governing traffic into said section in opposite directions, code transmitting and receiving means at each end of each stretch of single track, each said code transmitting means operating at times to apply a code pulse to said stretch of track at its end in response to the actuation of its associated code receiving means by a similar code pulse received from the other end of said stretch, each said code transmitting means also operating at other times to apply code pulses to its end of said stretch independently of the reception of code pulses from the opposite end of that stretch, circuit means governed by said code receiving means at each end of each single track stretch for controlling the associated head block signal to indicate clear when code pulses are being received at that end of the stretch from its opposite end, line wires extending between the ends of said section adjacent said passing siding, circuit means governed by the stop or clear condition of the head block signal at each end of said passing siding to correspondingly control the entering signal next in the rear over said line wires to indicate clear or stop respectively, a directional stick relay associated with each head block signal adjacent said passing siding ends, pick up circuit means for each directional stick relay rendered effective when a first train passes its respective head block signal at clear upon leaving said section adjacent said passing siding, stick circuit means for each directional stick relay effective to maintain its stick relay picked up until the code receiving means for the corresponding head block signal is again actuated by a code, and circuit means governed by each directional stick relay when picked up to control the entering signal next in the rear over said line wires to indicate caution for a following train, whereby the entrance of a train into a single track stretch toward said passing siding causes both the opposing head block signal and the entering signal next in the rear thereof to indicate stop, but whereby the entrance of a train into a single track stretch upon leaving said section adjacent said passing siding causes the entering signal next in the rear to indicate caution.

17. In a coded track circuit signalling system for railroads having a stretch of single track between two passing sidings and a section of track adjacent each passing siding and connected to its respective end of said single track stretch, a head block signal at each end of said single track stretch for governing traffic into the stretch in opposite direction, an entering signal at the entrance to each said sections adjacent said passing sidings and for governing traffic toward said single track stretch, code transmitting and receiving means at each end of said single track stretch, each said code transmitting means operating at times to apply a code pulse to said stretch of track at its end in response to the actuation of its associated code receiving means by a similar code pulse received from the other end of said single track stretch, each said code transmitting means also operating at other times to apply code pulses to its end of said stretch independently of the reception of code pulses from the opposite end of said stretch, circuit means governed by said code receiving means at each end of said stretch for controlling the associated head block signal to indicate clear when code pulses are being received from the other end of said stretch and to indicate stop when no code pulses are received, entering signal circuit means governed by the clear or stop condition of each head block signal to correspondingly control the entering signal next in the rear to indicate clear or stop respectively, a directional stick relay associated with each head block signal, circuit means for actuating said directional stick relays only when a train passes its respective head block signal while it is indicating clear and in a direction governed by that signal, said circuit means causing said directional stick relay to remain actuated until the associated code receiving means for the corresponding head block signal again receives a code from the opposite end of said single track stretch, and circuit means at each head block signal and including said directional stick relay at that signal for acting upon said entering signal circuit means to cause such entering signal in the rear of that head block signal to indicate caution.

18. In a coded track circuit signalling system for railroads having a stretch of single track between two passing sidings and a section of track adjacent each passing siding and connected to its respective end of said single track stretch, a head block signal at each end of said single track stretch for governing traffic into the stretch in opposite directions, an entering signal adjacent each head block signal for governing traffic out of said single track stretch into said siding section at the corresponding end, code transmitting and receiving means at each end of said single track stretch, each code transmitting means operating to apply code pulses into the track rails of said single track stretch at its end when its associated code receiving means is intermittently actuated by the reception of similar code pulses from the opposite end of said single track stretch, each said code transmitting means also operating to apply code pulses to its end of said stretch independently of the reception of code pulses from the opposite end of said stretch, circuit means governed by said code receiving means at each end of said stretch for controlling the associated head block signal to indicate clear when code pulses are being received from the opposite end and to indicate stop when no code pulses are being received, entering signal control circuit means for each entering signal to cause it to indicate clear or stop in accordance with traffic conditions, circuit means for each said siding section responsive to the presence of a train in that section for stopping all operation of said code transmitting means for the adjacent end of said single track stretch, a directional stick relay associated with each entering signal, pick-up circuit means for each said directional stick relay rendered effective when a train passes out of said single track stretch into the corresponding siding section past the associated entering signal while it is indicating clear, stick circuit means for each said directional stick relay effective to maintain its stick relay picked up until its respective siding section is vacated, and circuit means governed by each directional stick relay when picked up for rendering said code transmitting means for the corresponding end of said single track stretch operative to transmit code pulses regardless of the presence of a train in the adjacent siding section.

19. In a coded track circuit signalling system for railroads having a stretch of single track between two passing sidings and a section of track adjacent each passing siding and connected to its respective end of said single track stretch, a head block signal at each end of said single track stretch for governing traffic into the stretch in opposite directions, an entering signal at each end of each said section adjacent said passing sidings for governing traffic in opposite directions through that siding section, code transmitting and receiving means at each end of said single track stretch, each said code transmitting means operating to apply code pulses to said stretch of track at its end when its associated code receiving means is intermittently actuated by similar code pulses received from the opposite end of said single track stretch, each said code transmitting means also operating to apply code pulses to its end of said stretch independently of the reception of code pulses from the opposite end of said stretch, circuit means governed by said code receiving means at each end of said stretch for controlling the associated head block signal to indicate clear when code pulses are being received from the other end of said stretch and to indicate stop when no code pulses are being received, entering signal control circuit means governed by the clear or stop condition of each head block signal to correspondingly control the entering signal next in the rear to indicate clear or stop respectively, other entering signal control circuit means for each of the other entering signals governed in accordance with traffic conditions for controlling that signal to clear or stop, a directional stick relay associated with each head block signal, circuit means for each directional stick relay for actuating that relay only when a train passes its respective head block signal while it is indicating clear and in a direction governed by that signal, said circuit means causing said directional stick relay to remain actuated until the associated code receiving means for the corresponding head block signal again receives a code from the opposite end of said single track stretch, circuit means at each head block signal including said directional stick relay at that signal for acting upon said entering signal control circuit means to cause such entering signal next in the rear of that head block signal to indicate caution when such directional stick relay is actuated, circuit means for each said section adjacent a passing siding responsive to the presence of a train in that section for stopping all operation of said code transmitting means for the adjacent end of said single track stretch, a directional stick relay associated with each entering signal adjacent the end of said single track stretch, pick-up circuit means for each said directional stick relay rendered effective when a train passes out of a single track stretch into a siding section past the associated entering signal while it is indicating clear, stick circuit means for each said directional stick relay effective to maintain its stick relay picked up while its respective siding section is occupied, and circuit means governed by each directional stick relay when picked up for rendering said code transmitting means for the corresponding end of said single track stretch operative to transmit code pulses regardless of the presence of a train in the adjacent siding section.

20. In a coded track circuit signalling system, code transmitting and receiving means at each end of a stretch of track, said receiving means including a track relay normally connected across the track rails, said transmitting means including a transmitting relay effective when energized to transmit a code pulse by disconnecting said track relay and connecting a source of energy across the track rails, circuit means effective while said track relay is deenergized for causing the energization of said transmitting relay to thereby transmit a code pulse, a pulse timing relay made slow releasing by the discharging of an associated charged capacitor through a discharging circuit when such pulse timing relay is picked up, circuit means for causing said pulse timing relay to be picked up when said transmitting relay is energized and being effective while picked up to deenergize said transmitting relay, said pulse timing relay being maintained energized until its associated capacitor is substantially discharged, and circuit means governed by said track relay to open said discharging circuit of said capacitor to immediately release said timing relay if said track relay is picked up while said timing relay is still held up by the discharge of said capacitor.

21. In a coded track circuit type of signalling system for a stretch of single track extending between two passing sidings, a headblock signal at each end of said single track stretch for governing traffic into that stretch in opposite directions, a leaving signal at each end of said stretch for governing traffic out of the stretch in opposite directions, code transmitting and receiving means at each end of said stretch, each of said code transmitting means normally operating to apply a code pulse to said stretch of track at its end in response to the reception of a code pulse by its associated code receiving means of a similar code pulse received from the other end of said stretch, each said code transmitting means also at times operating to apply code pulses to its end of said stretch independently of the reception of code pulses from the opposite end of that stretch, circuit means governed by said code receiving means at each end of said stretch in response to the reception of code pulses for controlling the associated headblock signal to indicate clear, circuit means at each end of said stretch controlled by the associated leaving signal for selecting the polarity of the pulses applied by the associated code transmitting means in accordance with the indication then displayed by such leaving signal, and intermediate signals in such stretch each having code receiving means distinctively responsive to the polarity of the pulses transmitted from the leaving end of the stretch for that a signal for selectively determining the indication displayed by such intermediate signal.

References Cited in the file of this patent

UNITED STATES PATENTS

| | | |
|---|---|---|
| 2,291,579 | Judge | July 28, 1942 |
| 2,335,765 | Judge | Nov. 30, 1943 |
| 2,350,620 | Judge | June 6, 1944 |
| 2,350,657 | Wynn | June 6, 1944 |
| 2,351,540 | Pelikan | June 13, 1944 |
| 2,555,013 | Staples | May 29, 1951 |
| 2,558,473 | Young | June 26, 1951 |